(12) United States Patent
Taki et al.

(10) Patent No.: US 10,162,594 B2
(45) Date of Patent: Dec. 25, 2018

(54) INFORMATION PROCESSING DEVICE, METHOD OF INFORMATION PROCESSING, AND PROGRAM

(71) Applicant: SONY CORPORATION, Tokyo (JP)

(72) Inventors: Yuhei Taki, Kanagawa (JP); Shinichi Kawano, Tokyo (JP); Kunihito Sawai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/521,448

(22) PCT Filed: Jun. 29, 2016

(86) PCT No.: PCT/JP2016/069356
§ 371 (c)(1),
(2) Date: Apr. 24, 2017

(87) PCT Pub. No.: WO2017/061149
PCT Pub. Date: Apr. 13, 2017

(65) Prior Publication Data
US 2017/0337034 A1 Nov. 23, 2017

(30) Foreign Application Priority Data

Oct. 8, 2015 (JP) ................................. 2015-200288

(51) Int. Cl.
*G06F 3/16* (2006.01)
*G10L 15/22* (2006.01)
*G10L 15/28* (2013.01)

(52) U.S. Cl.
CPC .............. *G06F 3/165* (2013.01); *G10L 15/22* (2013.01); *G10L 15/28* (2013.01); *G10L 2015/228* (2013.01)

(58) Field of Classification Search
None
See application file for complete search history.

(56) References Cited

U.S. PATENT DOCUMENTS

| 5,860,064 | A   | * | 1/1999 | Henton    | G10L 13/033 |
|-----------|-----|---|--------|-----------|-------------|
|           |     |   |        |           | 204/266     |
| 8,510,109 | B2  | * | 8/2013 | Terrell, II | G10L 15/01 |
|           |     |   |        |           | 369/25.01   |
| 9,443,271 | B2  | * | 9/2016 | Tucker    | G06Q 50/01  |
| 2006/0025214 | A1 | * | 2/2006 | Smith    | A63F 13/12  |
|           |     |   |        |           | 463/30      |
| 2014/0029778 | A1 | * | 1/2014 | Bartunek | H04R 25/30  |
|           |     |   |        |           | 381/317     |
| 2016/0198047 | A1 | * | 7/2016 | McCormack | H04M 3/5175 |
|           |     |   |        |           | 379/265.09  |

* cited by examiner

*Primary Examiner* — Paul Huber
(74) *Attorney, Agent, or Firm* — Paratus Law Group, PLLC

(57) ABSTRACT

There is provided an information processing device technology that enables the user to know intuitively the situation in which the speech recognition processing is performed, the information processing device including: an information acquisition unit configured to acquire a parameter related to speech recognition processing on sound information based on sound collection; and an output unit configured to output display information used to display a speech recognition processing result for the sound information on the basis of a display mode specified depending on the parameter.

20 Claims, 21 Drawing Sheets

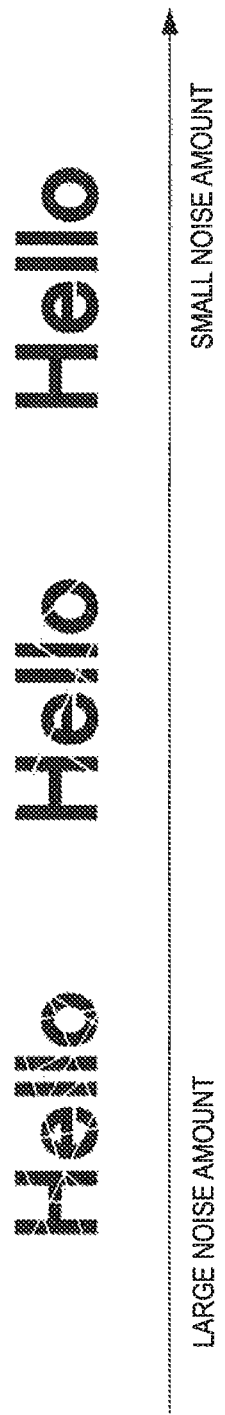

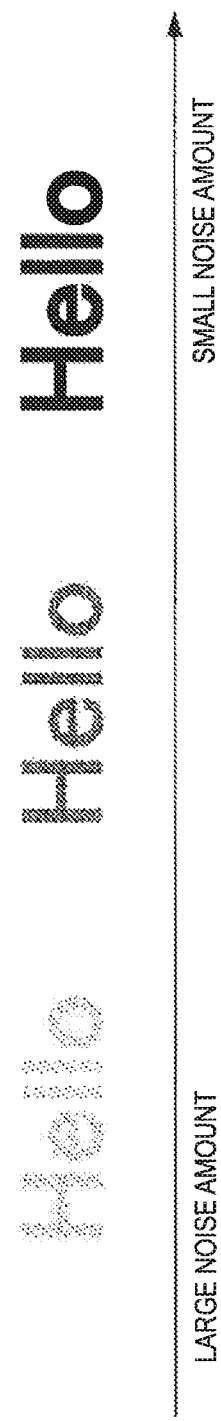

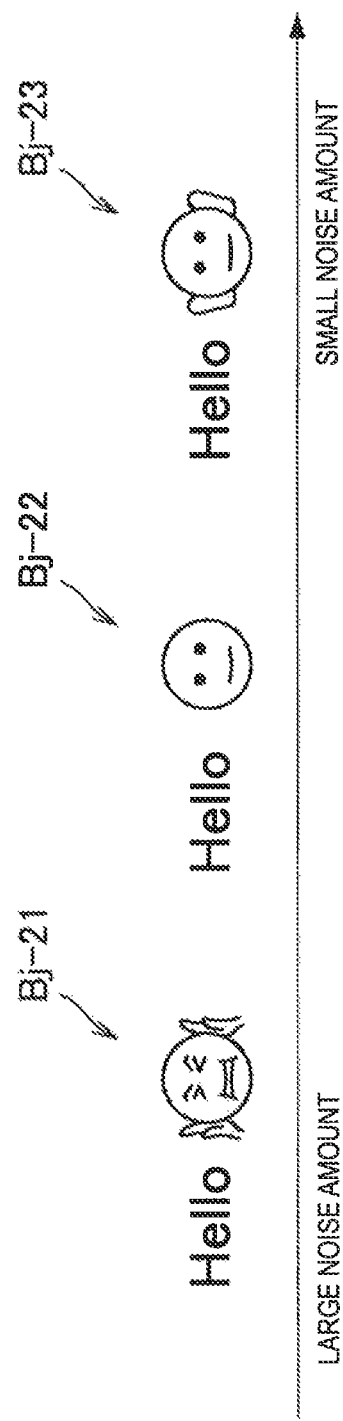

FIG.10

| PARAMETER (SOUND INFORMATION) | CONTROL EXAMPLE OF DISPLAY MODE |
|---|---|
| UTTERANCE VOLUME | CONTROL SIZE |
| SPEECH LIKENESS (SPEECH/NOISE) OR NOISE AMOUNT | CONTROL BLURRING DEGREE, CRACKING DEGREE, OR TYPE OF OBJECT |
| NOISE DIRECTION | BLURRED PORTION |
| FREQUENCY DISTRIBUTION (PITCH OF SOUND) | CONTROL SATURATION |
| UTTERANCE SPEED (LARGER THAN UPPER LIMIT SPEED) | ADD BLINKING ANIMATED IMAGE |
| UTTERANCE SPEED (SMALLER THAN LOWER LIMIT SPEED) | ADD 3D ROTATION ANIMATED IMAGE |
| CONFIDENTIAL LEVEL | CONTROL TRANSPARENCY |
| CHANGE OF WORD ENDING | ADD ANIMATED IMAGE MOVING IN LEFT AND RIGHT DIRECTIONS |
| EMOTION (JOY) | ADD OBJECT TO END |
| EMOTION (SURPRISE) | ADD MARK (!) AND OBJECT TO END |
| EMOTION (ANGER) | CHANGE TO RED AND ADD OBJECT TO END |

FIG. 11

| PARAMETER (INPUT IMAGE) | CONTROL EXAMPLE OF DISPLAY MODE |
|---|---|
| EMOTION (JOY) | ADD OBJECT TO END |
| EMOTION (SURPRISE) | ADD MARK (!) AND OBJECT TO END |
| EMOTION (ANGER) | CHANGE TO RED AND ADD OBJECT TO END |
| SEX | CONTROL FONT |
| AGE | CONTROL COLOR |
| CONCENTRATION LEVEL | CONTROL COLOR OR SIZE, OR ADD OBJECT TO END |

FIG.12

| PARAMETER (BIOMETRIC INFORMATION) | CONTROL EXAMPLE OF DISPLAY MODE |
|---|---|
| CONCENTRATION LEVEL | CONTROL COLOR OR SIZE, OR ADD OBJECT TO END |
| GRIPPING PRESSURE | CONTROL SIZE (HIGH PRESSURE: LARGE IN SIZE, LOW PRESSURE: SMALL IN SIZE) |
| PERSPIRATION (LARGER THAN UPPER LIMIT PERSPIRATION AMOUNT) | ADD OBJECT TO END |
| HEARTBEAT | ADD MOTION ANIMATED IMAGE DEPENDING ON HEART RATE |

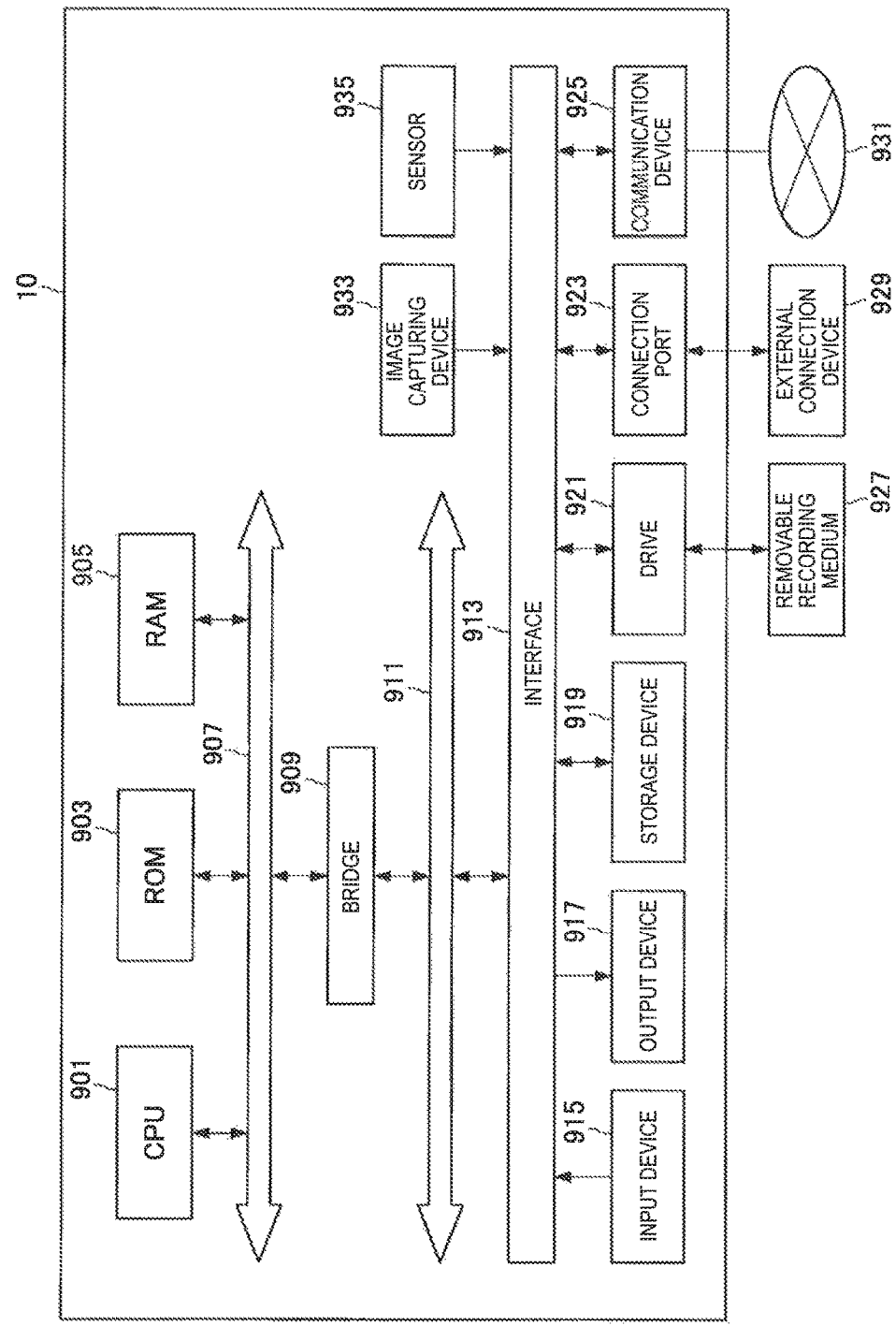

INFORMATION PROCESSING DEVICE, METHOD OF INFORMATION PROCESSING, AND PROGRAM

CROSS REFERENCE TO PRIOR APPLICATION

This application is a National Stage Patent Application of PCT International Patent Application No. PCT/JP2016/069356 (filed on Jun. 29, 2016) under 35 U.S.C. § 371, which claims priority to Japanese Patent Application No. 2015-200288 (filed on Oct. 8, 2015), which are all hereby incorporated by reference in their entirety.

TECHNICAL FIELD

The present disclosure relates to an information processing device, a method of information processing, and a program.

BACKGROUND ART

Recently, there has been a technique for performing speech recognition processing on sound information collected by a microphone to obtain a result of the speech recognition processing from the sound information (e.g., see Patent Literature 1). In one example, the speech recognition processing result obtained by the speech recognition processing is displayed on the display device depending on a predetermined display mode.

CITATION LIST

Patent Literature

Patent Literature 1: JP 2013-025605A

DISCLOSURE OF INVENTION

Technical Problem

However, it is difficult for the user to know intuitively the situation in which the speech recognition processing is performed only by visually recognizing the speech recognition processing result. Thus, it is desirable to provide a technology that enables the user to know intuitively the situation in which the speech recognition processing is performed.

Solution to Problem

According to the present disclosure, there is provided an information processing device including: an information acquisition unit configured to acquire a parameter related to speech recognition processing on sound information based on sound collection; and an output unit configured to output display information used to display a speech recognition processing result for the sound information on the basis of a display mode specified depending on the parameter.

According to the present disclosure, there is provided a method of information processing, the method including: acquiring a parameter related to speech recognition processing on sound information based on sound collection; and outputting, by a processor, display information used to display a speech recognition processing result for the sound information on the basis of a display mode specified depending on the parameter.

According to the present disclosure, there is provided a program for causing a computer to function as an information processing device including: an information acquisition unit configured to acquire a parameter related to speech recognition processing on sound information based on sound collection; and an output unit configured to output display information used to display a speech recognition processing result for the sound information on the basis of a display mode specified depending on the parameter.

Advantageous Effects of Invention

As described above, according to the present disclosure, there is provided a technology that enables the user to know intuitively the situation in which the speech recognition processing is performed. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrated to describe a case where the noise amount included in sound information is used as a parameter and a case where the cracking degree of text is used as a display mode specified depending on the parameter.

FIG. 6 is a diagram illustrated to describe a case where the noise amount included in sound information is used as a parameter and a case where the blurring degree of text is used as a display mode specified depending on the parameter.

FIG. 7 is a diagram illustrated to describe a case where the noise amount included in sound information is used as a parameter and a case where the type of an object added to text is used as a display mode specified depending on the parameter.

FIG. 10 is a diagram illustrating an example of a display mode of text specified in a case where predetermined data based on sound information collected by a sound collection unit is used as a parameter.

FIG. 11 is a diagram illustrating an example of a display mode of text specified in a case where a result obtained by analyzing an input image that is input by an image input unit is used as a parameter.

FIG. 12 is a diagram illustrating an example of a display mode of text specified in a case where a result obtained by analyzing biometric information that is input by a biometric information input unit is used as a parameter.

FIG. 21 is a block diagram illustrating a hardware configuration example of the information processing system according to the present embodiment.

MODE(S) FOR CARRYING OUT THE INVENTION

Figure 1:
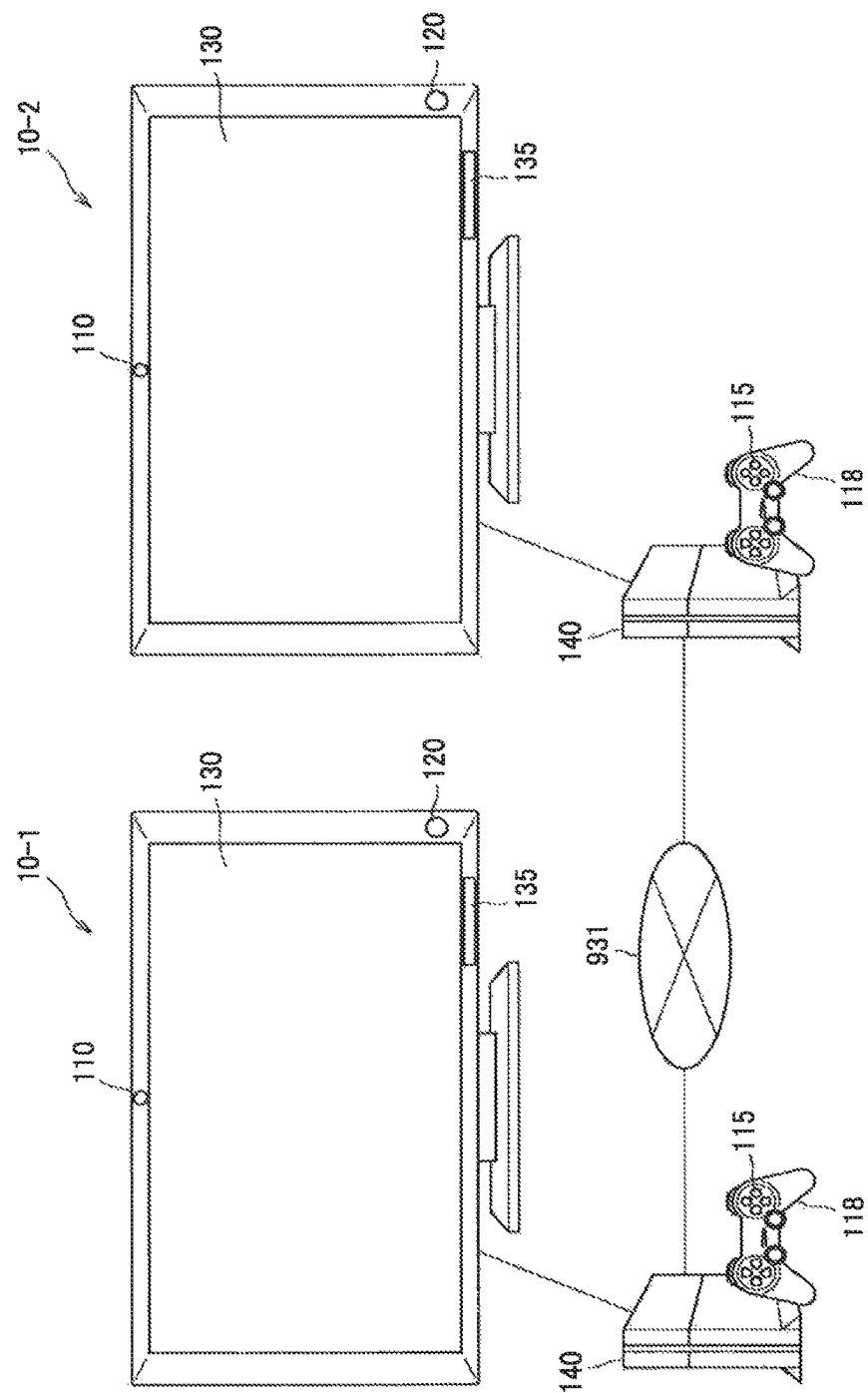
FIG. 1 is a diagram illustrating a configuration example of a communication system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different numbers after the same reference sign. However, when there is no need in particular to distinguish structural elements that have substantially the same function and structure, the same reference sign alone is attached.

Moreover, the description is given in the following order.
1. Embodiment of present disclosure
1.1. System configuration example
1.2. Functional configuration example
1.3. Details of function of information processing system
1.4. Modifications
1.5. Hardware configuration example
2. Conclusion

1. EMBODIMENT OF PRESENT DISCLOSURE

1.1. System Configuration Example

A configuration example of a communication system according to an embodiment of the present disclosure is described with reference to the drawings. FIG. 1 is a diagram illustrating a configuration example of a communication system according to an embodiment of the present disclosure. As illustrated in FIG. 1, the communication system according to the present embodiment is configured to include an information processing system 10-1 and an information processing system 10-2. Each of the information processing system 10-1 and the information processing system 10-2 is configured to include an image input unit 110, an operation input unit 115, a biometric information input unit 118, a sound collection unit 120, a display unit 130, a sound output unit 135, and an information processing device (hereinafter also referred to as "control unit") 140.

The information processing device 140 in the information processing system 10-1 can communicate with the information processing device 140 in the information processing system 10-2 via a network 931. In addition, in the information processing system 10, the image input unit 110, the sound collection unit 120, and the sound output unit 135 are provided on the frame of the display unit 130. However, the position where the image input unit 110, the sound collection unit 120, and the sound output unit 135 are provided is not limited. The image input unit 110, the sound collection unit 120, and the sound output unit 135 may be provided at a position other than the frame of the display unit 130, or may be provided at a position (e.g., the operation input unit 115) other than the display unit 130, and sound information collected by the sound collection unit 120 may be transmitted to the information processing device 140.

Moreover, in the example illustrated in FIG. 1, the information processing device 140 is a game console, but the form of the information processing device 140 is not limited to the game console. In one example, the information processing device 140 may be a smartphone, a mobile phone, a tablet terminal, or a personal computer (PC). In the following description, the terms speech (or voice) and sound are used herein to be distinguished from each other.

The configuration example of the communication system according to the present embodiment is described above.

1.2. Functional Configuration Example

Figure 2:
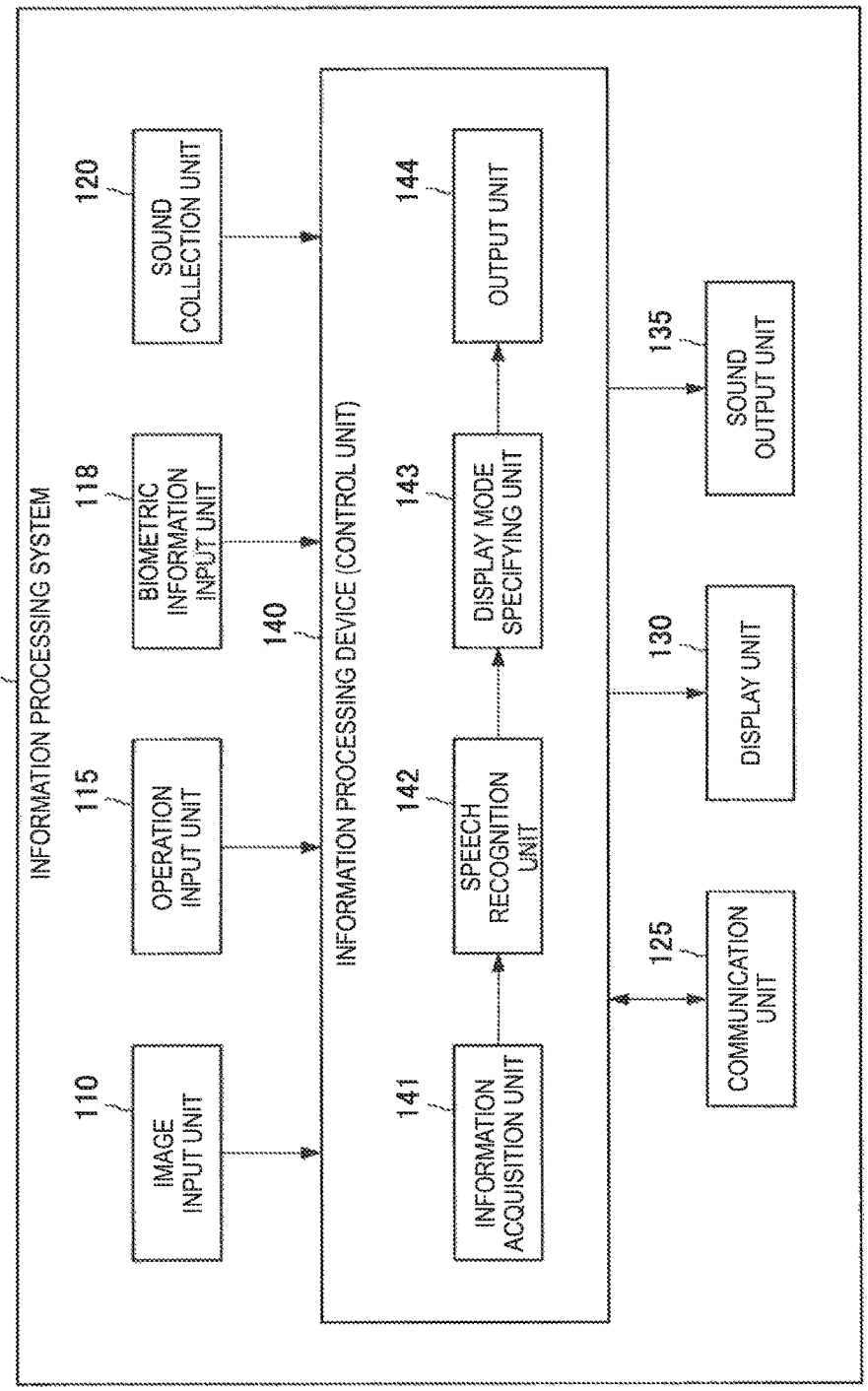
FIG. 2 is a block diagram illustrating a functional configuration example of an information processing system according to the present embodiment.

Then, a functional configuration example of the information processing system 10 according to the present embodiment is described. FIG. 2 is a block diagram illustrating a functional configuration example of the information processing system 10 according to the present embodiment. As illustrated in FIG. 2, the information processing system 10 is configured to include the image input unit 110, the operation input unit 115, the biometric information input unit 118, the sound collection unit 120, a communication unit 125, the display unit 130, the sound output unit 135, and the control unit 140.

The image input unit 110 has a function to input an image. In one example, the image input unit 110 includes a camera, and accepts an image captured by the camera as input. The number of cameras included in the image input unit 110 is not limited to a particular number as long as it is one or more. The position where each of one or more cameras included in the image input unit 110 is provided is also not limited to a particular position. In addition, an example of one or more cameras may include a monocular camera or a stereo camera.

The operation input unit 115 has a function to input a user's operation. In one example, the operation input unit 115 may include a controller of the game console. In addition, the operation input unit 115 may have a function to input a user's operation, and thus it may include a touch panel. An example of the type employed by the touch panel may include, but is not limited to, electrostatic capacitive, resistance film, infrared, or ultrasonic type. Further, the operation input unit 115 may be configured to include a camera.

The biometric information input unit 118 has a function to input biometric information of the user. In one example, in the case where the biometric information input unit 118 is provided with a pressure sensor, it is capable of inputting gripping pressure of the controller gripped by the user using the pressure sensor as biometric information. In addition, in the case where the biometric information input unit 118 is provided with a heartbeat sensor, it is capable of inputting the heartbeat of the user using the heartbeat sensor as biometric information. In addition, in the case where the biometric information input unit 118 is provided with a perspiration sensor, it is capable of inputting perspiration rates of the user using the perspiration sensor as biometric information. Moreover, in the present embodiment, the case where the biometric information input unit 118 is provided in the controller of the game console is mainly described, but the biometric information input unit 118 may be provided in a wearable device.

The sound collection unit 120 has a function to obtain sound information by sound collection. As described with reference to FIG. 1, the sound collection unit 120 may be provided on the frame of the display unit 130, but may be provided at a position other than the frame of the display unit 130 or may be provided at a position (e.g., the operation input unit 115) other than the display unit 130. The number of microphones included in the sound collection unit 120 is not limited to a particular number as long as it is one or more. In addition, the position where each of one or more microphones included in the sound collection unit 120 is provided is also not limited to a particular position.

However, in the case where the sound collection unit 120 is provided with a plurality of microphones, the arrival direction of sound can be estimated on the basis of the sound information obtained by sound collection by each of the plurality of microphones. Alternatively, in the case where the sound collection unit 120 is provided with a directional microphone, the arrival direction of sound can be estimated on the basis of the sound information obtained by sound collection by the directional microphone.

The control unit 140 executes control of each component in the information processing system 10. As illustrated in FIG. 2, the control unit 140 is configured to include an information acquisition unit 141, a speech recognition unit 142, a display mode specifying unit 143, and an output unit 144. Details of each of these functional blocks will be described later. Moreover, the control unit 140 may be composed of, for example, a central processing unit (CPU). In the case where the information processing device 140 is composed of a processing device such as a CPU, the processing device may be composed of electronic circuits.

The communication unit 125 has a function to communicate with another information processing system 10. In one example, the communication unit 125 is composed of a communication interface. In one example, the communication unit 125 can communicate with the other information processing system 10 via the network 931.

The display unit 130 has a function to display a screen. In one example, the display unit 180 may be a liquid crystal display, an organic electro-luminescence (EL) display, or a head-mounted display (HMD). However, the display unit 180 may be other forms of display as long as it has a function to display a screen.

The sound output unit 135 has a function to output sound information. In one example, the sound output unit 135 may be a loudspeaker, a headphone, or an earphone. However, the sound output unit 135 may be other forms of sound output device as long as it has a function to output sound information.

The functional configuration example of the information processing system 10 according to the present embodiment is described above.

1.3. Details of Function of Information Processing System

Figure 3:
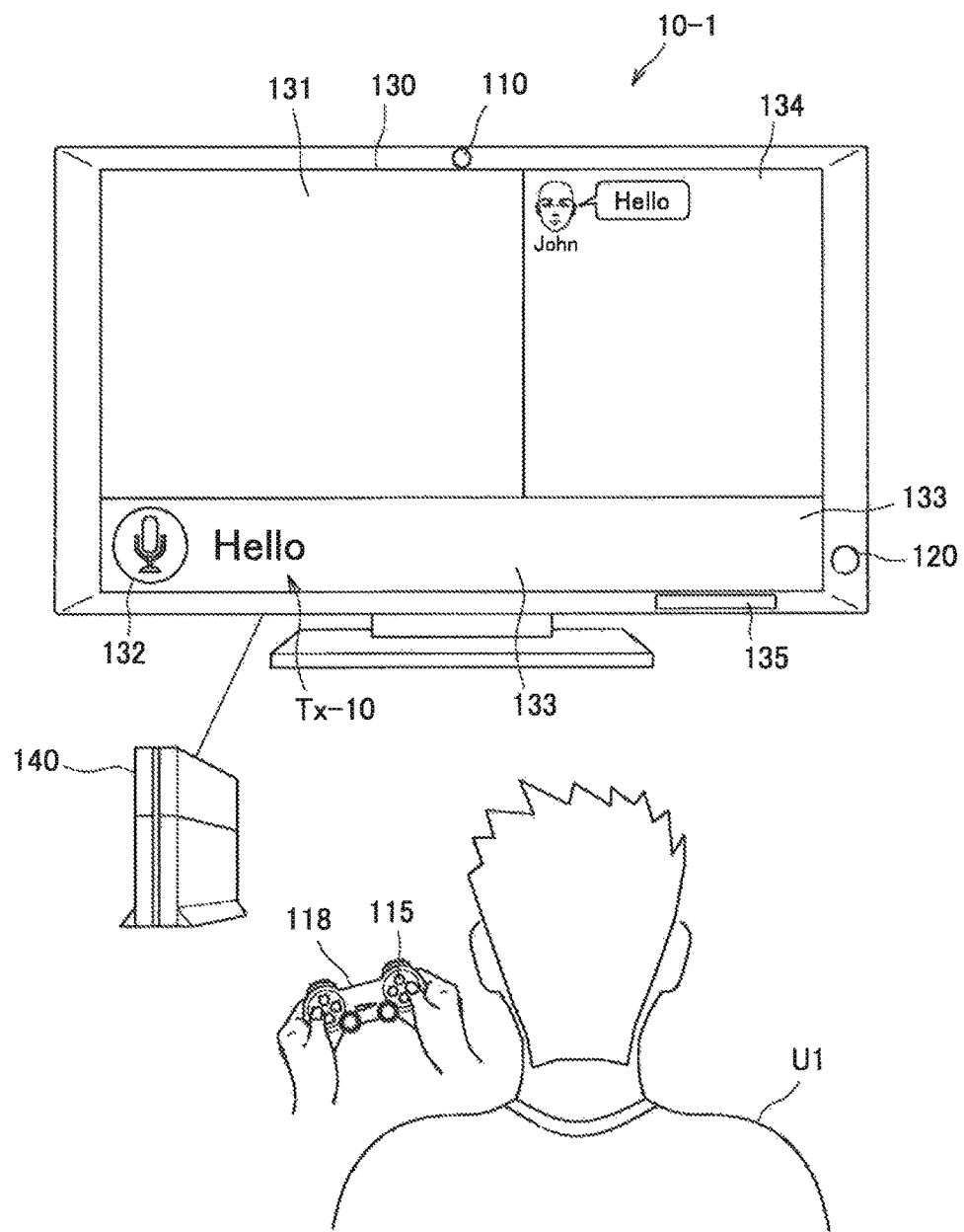
FIG. 3 is a diagram illustrated to describe an overview of the information processing system.

Then, the function of the information processing system 10 is described in detail. FIG. 3 is a diagram illustrated to describe an overview of the information processing system 10. Referring to FIG. 3, a video image display screen 131 on which a video image reproduced by the control unit 140 is displayed is located in the display unit 130. Here, the control unit 140 is envisaged to be a game console, and thus the video image displayed on the video image display screen 131 may be a video image included in a game application.

Further, referring to FIG. 3, a chat application for allowing a user U1 of the information processing system 10-1 to chat with a user of the information processing system 10-2 is executed by the control unit 140, and its execution screen is displayed as a chat screen 134 by the display unit 130. Referring to FIG. 3, a speech recognition processing result "Hello", obtained by performing speech recognition processing on sound information including the utterance of the user "John" of the information processing system 10-2 is displayed on the chat screen 134 of the information processing system 10-1. The speech recognition processing result may be one-character data obtained by subjecting sound information to speech recognition processing or may be string data in which a plurality of characters are arranged. The term "text" is used herein as an example of the speech recognition processing result.

On the other hand, as an example of the speech recognition processing result for the sound information collected by the sound collection unit 120 of the information processing system 10-1, the utterance screen 133 on which text is displayed is also located in the display unit 130. The utterance screen 133 displays a speech recognition processing start button 132 used to start the speech recognition processing. In addition, the utterance screen 133 displays text Tx-10 "Hello", as an example of the speech recognition processing result for the sound information collected by the sound collection unit 120 of the information processing system 10-1.

In one example, the text Tx-10 may be added to the chat screen 134. In addition, the text Tx-10 may be transmitted to the control unit 140 of the information processing system 10-2 and may be displayed on the chat screen of the information processing system 10-2. Here, it is difficult for the user U1 to know intuitively the situation in which the speech recognition processing is performed only by visually recognizing the text Tx-10. Thus, it is desirable to provide the technology that enables the user U1 to know intuitively the situation in which the speech recognition processing is performed.

More specifically, in the embodiment of the present disclosure, when the user U1 performs an operation for selecting the speech recognition processing start button 132 (hereinafter also referred to as "recognition start operation"), the recognition start operation is input by the operation input unit 115, and the user U1 starts utterance. When the sound collection unit 120 collects the sound information, the information acquisition unit 141 acquires the sound information collected by the sound collection unit 120. Moreover, in the present embodiment, a signal collected by the sound collection unit 120 is referred to as sound information, but the sound information may be a signal obtained by performing any kind of signal processing on the signal collected by the sound collection unit 120.

Then, when the text Tx-10 is obtained by performing the speech recognition processing by the speech recognition unit 142, the display mode specifying unit 143 specifies a display mode of the text Tx-10 depending on a parameter related to the speech recognition processing on the sound information. Details of such a parameter will be described later. The output unit 144 outputs display information used to display the text Tx-10 depending on the specified display mode. The display information may include text and display mode information that indicates a display mode. In addition, although the output destination of the display information is not limited, when the display information is output to the display unit 130, the display unit 130 can display the text Tx-10 depending on such a display mode on the utterance screen 133 on the basis of the display information.

In this manner, in the embodiment of the present disclosure, the display mode of the text Tx-10 is specified depending on the parameter related to the speech recognition processing, and the display information used to display the text Tx-10 is output depending on such a display mode. This configuration makes it possible for the user U1 to know intuitively the situation in which the speech recognition processing is performed depending on the display mode of the text Tx-10. Hereinafter, the case where the display mode is specified for each word will be described as an example, but the unit of specifying the display mode is not limited to a particular unit. In one example, the display mode may be specified for each phrase or for each sentence.

Further, a parameter related to the speech recognition processing is not limited to a particular parameter, but it may include, for example, utterance information of the user U1 that is included in the sound information collected by the sound collection unit 120. Furthermore, the display mode specified depending on the parameter is not limited to a particular mode, and it may include at least one of the size, shape, saturation, font, blurring degree, and cracking degree of the text Tx-10, type of an animated image added to the text Tx-10, and type of an object added to the text Tx-10.

Figure 4:
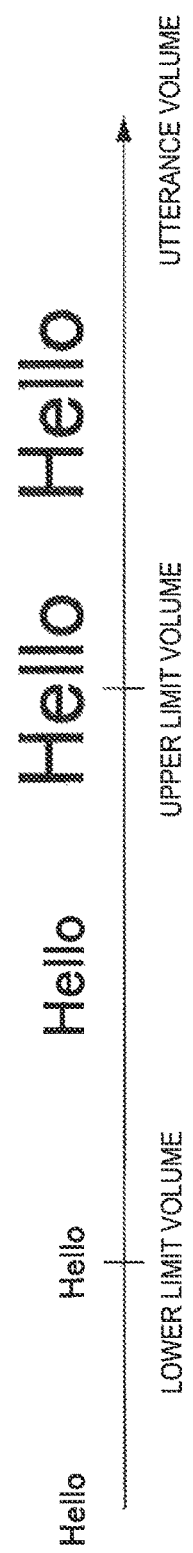
FIG. 4 is a diagram illustrated to describe a case where utterance volume of a user that is included in sound information is used as a parameter related to a speech recognition processing and a case where the size of text is used as a display mode specified depending on the parameter.

Examples of such a parameter and a display mode specified depending on the parameter are now described. FIG. 4 is a diagram illustrated to describe a case where utterance volume of a user (the user U1 shown in FIG. 3) that is included in the sound information is used as a parameter related to the speech recognition processing and a case where the size (the text Tx-10 shown in FIG. 3) of text is used as the display mode specified depending on the parameter. Referring to FIG. 4, the utterance volume of the user and the size of the text "Hello" specified depending on the utterance volume are shown along the horizontal axis.

As illustrated in FIG. 4, the display mode specifying unit 143 may increase the size of the text "Hello" as the utterance volume increases in a range from a predetermined lower limit volume to a predetermined upper limit volume. This makes it possible for the user to know intuitively the utterance volume as an example of the situation in which the speech recognition processing is performed. On the other hand, in the case where the utterance volume falls below the predetermined lower limit volume, the display mode specifying unit 143 may set the size of the text "Hello" to a fixed value. In addition, in the case where the utterance volume exceeds the predetermined upper limit volume, the display mode specifying unit 143 may set the size of the text "Hello" to a fixed value.

Further, the parameter may include information related to noise corresponding to the user's utterance included in the sound information collected by the sound collection unit 120. The information related to noise is not limited to a particular type, and an example of the information related to noise may include the type of noise, volume of noise (hereinafter also referred to as "noise amount"), and a direction from a noise source to the sound collection unit 120 (hereinafter also referred to as "noise direction"). FIG. 5 is a diagram illustrated to describe a case where the noise amount included in sound information is used as a parameter and a case where the cracking degree of text (the text Tx-10 shown in FIG. 3) is used as a display mode specified depending on the parameter.

Referring to FIG. 5, the noise amount and the cracking degree of the text "Hello" specified depending on the noise amount are shown along the horizontal axis. As illustrated in FIG. 5, the display mode specifying unit 143 may increase the cracking degree of the text "Hello", as the noise amount increases. This makes it possible for the user to know intuitively the noise amount as an example of the situation in which the speech recognition processing is performed.

FIG. 6 is a diagram illustrated to describe a case where the noise amount included in the sound information is used as a parameter of FIG. 7 and a case where the blurring degree of the text (the text Tx-10 shown in FIG. 3) is specified as a display mode depending on the parameter. Referring to FIG. 6, the noise amount and the blurring degree of the text "Hello" specified depending on the noise amount are shown along the horizontal axis. As illustrated in FIG. 6, the display mode specifying unit 143 may increase the blurring degree of the text "Hello", as the noise amount increases. This makes it possible for the user to know intuitively the noise amount as an example of the situation in which the speech recognition processing is performed.

FIG. 7 is a diagram illustrated to describe a case where the noise amount included in the sound information is used as a parameter and a case where the type of an object added to text (the text Tx-10 shown in FIG. 3) is used as a display mode specified depending on the parameter. Referring to FIG. 7, the noise amount and the type of an object Bj specified depending on the noise amount are shown along the horizontal axis.

As illustrated in FIG. 7, in the case where the noise amount is within a range from a predetermined upper limit noise amount to a predetermined lower limit noise amount, the display mode specifying unit 143 may specify an object Bj-22 as an object to be added to the text "Hello". In addition, in the case where the noise amount exceeds the predetermined upper limit noise amount, the display mode specifying unit 143 may specify an object Bj-21 as an object to be added to the text "Hello". In addition, in the case where the noise amount falls below the predetermined lower limit noise amount, the display mode specifying unit 143 may specify an object Bj-23 as an object to be added to the text "Hello". This makes it possible for the user to know intuitively the noise amount as an example of the situation in which the speech recognition processing is performed.

Moreover, although FIG. 7 illustrates the example in which the objects Bj-21 to Bj-23 are added to the end of the text "Hello", the position to which the objects Bj-21 to Bj-23 are added is not limited to the end of the text "Hello". In one example, the objects Bj-21 to Bj-23 may be added to the head of the text "Hello". In addition, here, it is envisaged that the objects Bj-21 to Bj-23 are still images, but the objects Bj-21 to Bj-23 may be any data. In one example, the objects Bj-21 to Bj-23 may be moving images or may be text data.

Figure 8A:
FIG. 8A is a diagram illustrated to describe a case where a noise direction is used as a parameter and a case where the blurring degree of text is used as a display mode specified depending on the parameter.
Figure 8B:
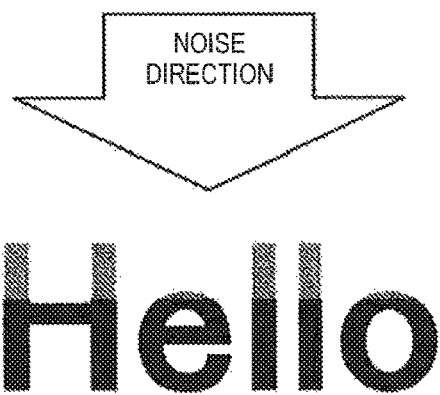
FIG. 8B is a diagram illustrated to describe a case where a noise direction is used as a parameter and a case where the blurring degree of text is used as a display mode specified depending on the parameter.

FIGS. 8A and 8B are diagrams illustrated to describe a case where a noise direction is used as a parameter and a case where the blurring degree of text (the text Tx-10 shown in FIG. 3) is used as a display mode specified depending on the parameter. Referring to FIGS. 8A and 8B, the noise direction and the blurring degree of the text "Hello" specified depending on the noise direction are shown.

As illustrated in FIG. 8A, in the case where the noise direction is from the left to the right of the screen, the display mode specifying unit 143 may cause the blurring degree to be larger on the left side than on the right side of the text "Hello". Alternatively, as illustrated in FIG. 8B, in the case where the noise direction is from the top to the bottom of the screen, the display mode specifying unit 143 may cause the blurring degree to be larger on the upper side than on the lower side of the text "Hello". This makes it possible for the user to know intuitively the noise direction as an example of the situation in which the speech recognition processing is performed.

Figure 9A:
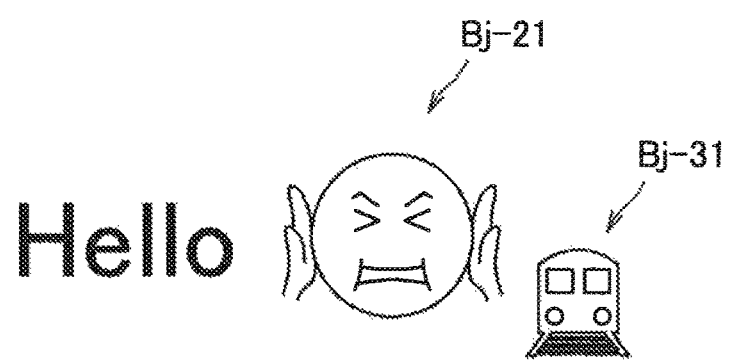
FIG. 9A is a diagram illustrated to describe a case where the type of noise included in sound information is used as a parameter and a case where the type of an object added to text is used as a display mode specified depending on the parameter.
Figure 9B:
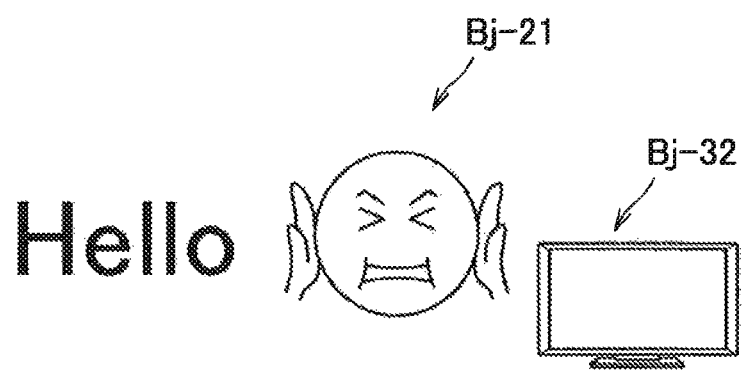
FIG. 9B is a diagram illustrated to describe a case where the type of noise included in sound information is used as a parameter and a case where the type of an object added to text is used as a display mode specified depending on the parameter.
Figure 9C:
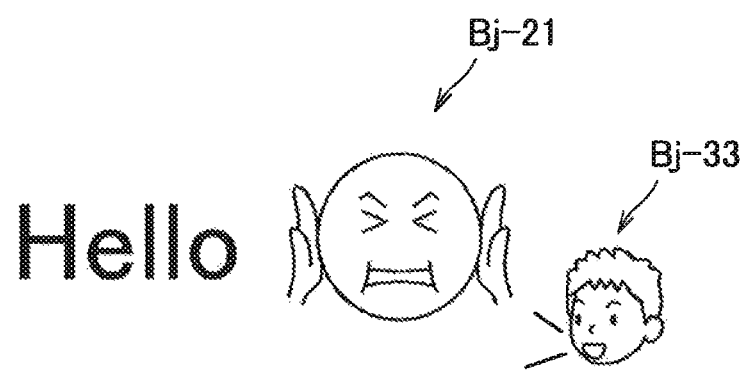
FIG. 9C is a diagram illustrated to describe a case where the type of noise included in sound information is used as a parameter and a case where the type of an object added to text is used as a display mode specified depending on the parameter.

FIGS. 9A, 9B, and 9C are diagrams illustrated to describe a case where the type of noise included in the sound information is used as a parameter and a case where the type of an object added to text (the text Tx-10 shown in FIG. 3) is used as a display mode specified depending on the parameter. Referring to FIGS. 9A to 9C, although the object Bj-21 specified depending on the noise amount is added to the text "Hello", the object Bj-21 specified depending on the noise amount is not necessarily added to it.

As illustrated in FIG. 9A, in the case where the type of noise is noise coming from a train, the display mode specifying unit 143 may specify an object Bj-31 as an object to be added to the text "Hello". In addition, in the case where the type of noise is noise coming from a television device, the display mode specifying unit 143 may specify an object Bj-32 as an object to be added to the text "Hello". In addition, in the case where the type of noise is human voice, the display mode specifying unit 143 may specify an object Bj-33 as an object to be added to the text "Hello". This makes it possible for the user to know intuitively the type of noise as an example of the situation in which the speech recognition processing is performed.

Moreover, although FIGS. 9A, 9B, and 9C illustrate an example in which the objects Bj-31 to Bj-33 are added to the end of the text "Hello", the position to which the objects Bj-31 to Bj-33 are added is not limited to the end of the text "Hello". In one example, the objects Bj-31 to Bj-33 may be added to the head of the text "Hello". In addition, here, it is envisaged that the objects Bj-31 to Bj-33 are still images, but the objects Bj-31 to Bj-33 may be any data. In one example, the objects Bj-31 to Bj-33 may be moving images or may be text data.

Although some examples of a parameter and a display mode specified depending on the parameter are described in detail above, the parameter and the display mode specified depending on the parameter are not limited to the examples described above. An example of the parameter (utterance information of the user U1) may include at least one of the utterance volume of the user U1 included in the sound information, speech likeness of the sound information, a frequency of the sound information, a utterance speed of the speech included in the sound information, information related to the word ending of speech included in the sound information, and the confidence level of the text.

Further, the display mode may be specified further on the basis of the information related to the user U1. Here, the information related to the user U1 is not limited to a particular one, and it may include at least one of biometric information and emotion information of the user U1. The biometric information may be input by the biometric information input unit 118. The biometric information of the user U1 is not limited to a particular one, and may include at least one of the gripping pressure of the controller gripped by the user U1, perspiration of the user U1, and heartbeat of the user U1.

The emotion information of the user U1 may be obtained in any way. In one example, the emotion information of the user U1 may be obtained by analyzing the sound information or the input image by the display mode specifying unit 143. In addition, the emotion information of the user U1 is not limited to a particular one, and may include at least one of joy, surprise, and anger of the user U1. Alternatively, the emotion information of the user U1 may include other emotions.

Further, the information related to the user U1 may include at least one of sex and age of the user U1. The sex and age of the user U1 may be obtained in any way. In one example, the sex and age of the user U1 may be obtained by analyzing the input image by the display mode specifying unit 143. The age may be data indicating the age in a predetermined unit, for example, data indicating the age in units of ten years.

FIG. 10 is a diagram illustrating an example of a display mode of text (the text Tx-10 shown in FIG. 3) specified in the case where predetermined data based on the sound information collected by the sound collection unit 120 is used as a parameter. In one example, as illustrated in FIG. 10, the display mode specifying unit 143 may control the size of the text on the basis of the utterance volume of the user U1 that is included in the sound information collected by the sound collection unit 120.

Further, the display mode specifying unit 143 may control the blurring degree of the text, the cracking degree of the text, or the type of an object to be added to the text on the basis of the speech likeness (sound volume or noise volume) of the sound information collected by the sound collection unit 120. In addition, the display mode specifying unit 143 may control the blurring degree of the text, the cracking degree of the text, or the type of an object to be added to the text on the basis of the noise amount included in the sound information collected by the sound collection unit 120.

Further, the display mode specifying unit 143 may control a blurred portion of the text on the basis of the noise direction included in the sound information collected by the sound collection unit 120. In addition, the display mode specifying unit 143 may control saturation of the text on the basis of the frequency distribution (the pitch of sound) of the sound information collected by the sound collection unit 120.

Further, the display mode specifying unit 143 may specify an animated image to be added to the text on the basis of the utterance speed of speech included in the sound information collected by the sound collection unit 120. In one example, in the case where the utterance speed of the speech included in the sound information collected by the sound collection unit 120 exceeds a predetermined upper limit speed, the display mode specifying unit 143 may specify a blinking animated image as an animated image to be added to the text. In addition, in one example, in the case where the utterance speed of the speech included in the sound information collected by the sound collection unit 120 falls below a predetermined lower limit speed, the display mode specifying unit 143 may specify a 3D animated image as an animated image to be added to the text.

Further, the display mode specifying unit 143 may control transparency of the text on the basis of a confidential level (confidence level of the text) of the speech recognition processing on the speech included in the sound information collected by the sound collection unit 120. In one example, the display mode specifying unit 143 may increase the transparency of the text "Hello", as the confidential level decreases. This makes it possible for the user to know intuitively the confidential level of the speech recognition processing as an example of the situation in which the speech recognition processing is performed.

Further, the display mode specifying unit 143 may specify an animated image to be added to the text on the basis of information related to the word ending of the speech included in the sound information collected by the sound collection unit 120. In one example, in the case where extended time of the word ending of the speech included in the sound information collected by the sound collection unit 120 exceeds a predetermined time, the display mode specifying unit 143 may specify an animated image that moves in the left and right directions as an animated image to be added to the text.

Further, in the case where the emotion information obtained by analyzing the sound information indicates joy, the display mode specifying unit 143 may control the display mode so that a predetermined object is added to the end of the text. In addition, in the case where the emotion information obtained by analyzing the sound information indicates surprise, the display mode specifying unit 143 may control the display mode so that a predetermined mark (e.g., "!") and a predetermined object are added to the end of the text. In addition, in the case where the emotion information obtained by analyzing the sound information indicates anger, the display mode specifying unit 143 may control the display mode so that the color of the text is changed to a predetermined color (e.g., red) and a predetermined object is added to the end of the text.

FIG. 11 is a diagram illustrating an example of a display mode of text (the text Tx-10 shown in FIG. 3) specified in the case where a result obtained by analyzing an input image that is input by the image input unit 110 is used as a parameter. As illustrated in FIG. 11, in the case where the emotion information obtained by analyzing the input image indicates joy, the display mode specifying unit 143 may control the display mode so that a predetermined object is added to the end of the text.

Further, in the case where the emotion information obtained by analyzing the input image indicate surprise, the display mode specifying unit 143 may control the display mode so that a predetermined mark (e.g., "!") and a predetermined object are added to the end of the text. In addition, in the case where the emotion information obtained by analyzing the input image indicates anger, the display mode specifying unit 143 may control the display mode so that the color of the text is changed to a predetermined color (e.g., red) and a predetermined object is added to the end of the text.

Further, the display mode specifying unit 143 may control the font (e.g., character style) of the text depending on the sex obtained by analyzing the input image. In addition, the display mode specifying unit 143 may control the color of the text depending on the age obtained by analyzing the input image. In addition, the display mode specifying unit 143 may control the color of the text, the size of the text, or an object to be added to the end of the text, depending on the concentration level (or excitement level) of the user U1 that is obtained by analyzing the input image.

FIG. 12 is a diagram illustrating an example of a display mode of the text (text Tx-10 shown in FIG. 3) specified in the case where a result obtained by analyzing the biometric information that is input by the biometric information input unit 118 is used as a parameter. As illustrated in FIG. 12, the display mode specifying unit 143 may control the color of the text, the size of the text, or an object to be added to the end of the text, depending on the concentration level (or excitement level) of the user U1 that is obtained by analyzing the biometric information.

It is envisaged that the concentration level can vary depending on various types of biometric information. Thus, the biometric information used to calculate the concentration level may include at least one of body temperature, perspiration amount, pulse rate, respiratory rate, blink rate, eye movement, fixation duration, size of pupil diameter, blood pressure, brain wave, body motion, body posture, skin temperature, galvanic skin resistance, micro-vibration (MV), myoelectric potential, and SpO2 (blood oxygen saturation level) of the user U1.

Further, the display mode specifying unit 143 may control the size of the text on the basis of the gripping pressure of the controller. In one example, in the case where the gripping pressure of the controller is larger than a predetermined pressure, the display mode specifying unit 143 may increase the size of the text as compared with the case where it is smaller than the predetermined pressure. In addition, in the case where the perspiration amount of the user U1 exceeds a predetermined upper limit perspiration amount, the display mode specifying unit 143 may control the display mode so that a predetermined object is added to the end of the text.

Further, the display mode specifying unit 143 may control the display mode so that a motion animated image depending on the heart rate of the user U1 is added to the text. In one example, the display mode specifying unit 143 may control the display mode so that an animated image whose motion increases as the heart rate of the user U1 increases is added to the text.

Examples of the parameter and the display mode specified depending on the parameter are described above. The display mode specified in this manner may be unchangeable by the user U1, but it can be preferably changed on the basis of a predetermined change operation by the user U1 in consideration of the convenience of the user U1. The change operation is not limited to a particular one, and it may be an operation of pressing or tapping a button corresponding to the display mode.

Figure 13:
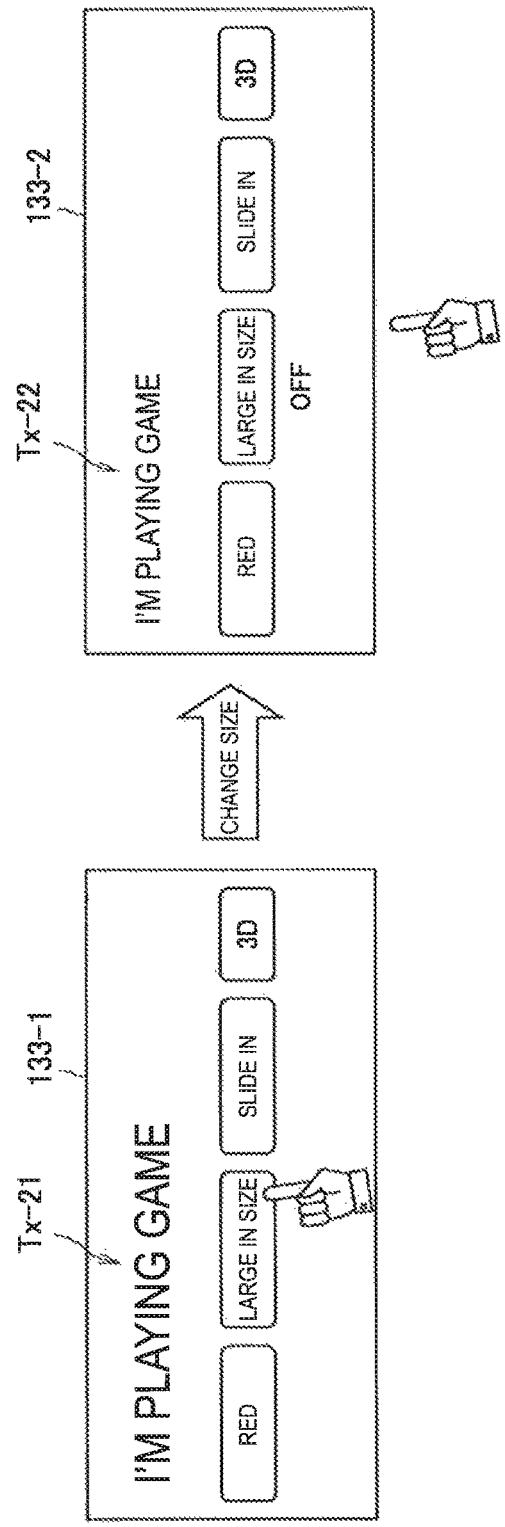
FIG. 13 is a diagram illustrating an example in which a display mode is changed on the basis of a change operation by a user.

FIG. 13 is a diagram illustrating an example in which the display mode is changed on the basis of the change operation by the user U1. Referring to FIG. 13, as an example of the speech recognition processing result for the utterance by the user U1, large-sized text Tx-21, "I'm playing game", is displayed on an utterance screen 133-1. In addition, as the display mode of the text specified depending on the parameter, "red", "large in size", "slide in", and "3D" are displayed on the utterance screen 133-1.

Here, it is envisaged that the user U1 wants to reduce the size of the text Tx-21, "I'm playing game". In this case, the user U1 may press or tap the "large in size" which is an example of the display mode. Then, an operation to press or tap "large in size" is input by the operation input unit 115, and the display mode specifying unit 143 cancels "large in size" which is the display mode of the text Tx-21, "I'm playing game". As a result, a smaller-sized text Tx-22, "I'm playing game", is displayed on an utterance screen 133-2.

Figure 14:
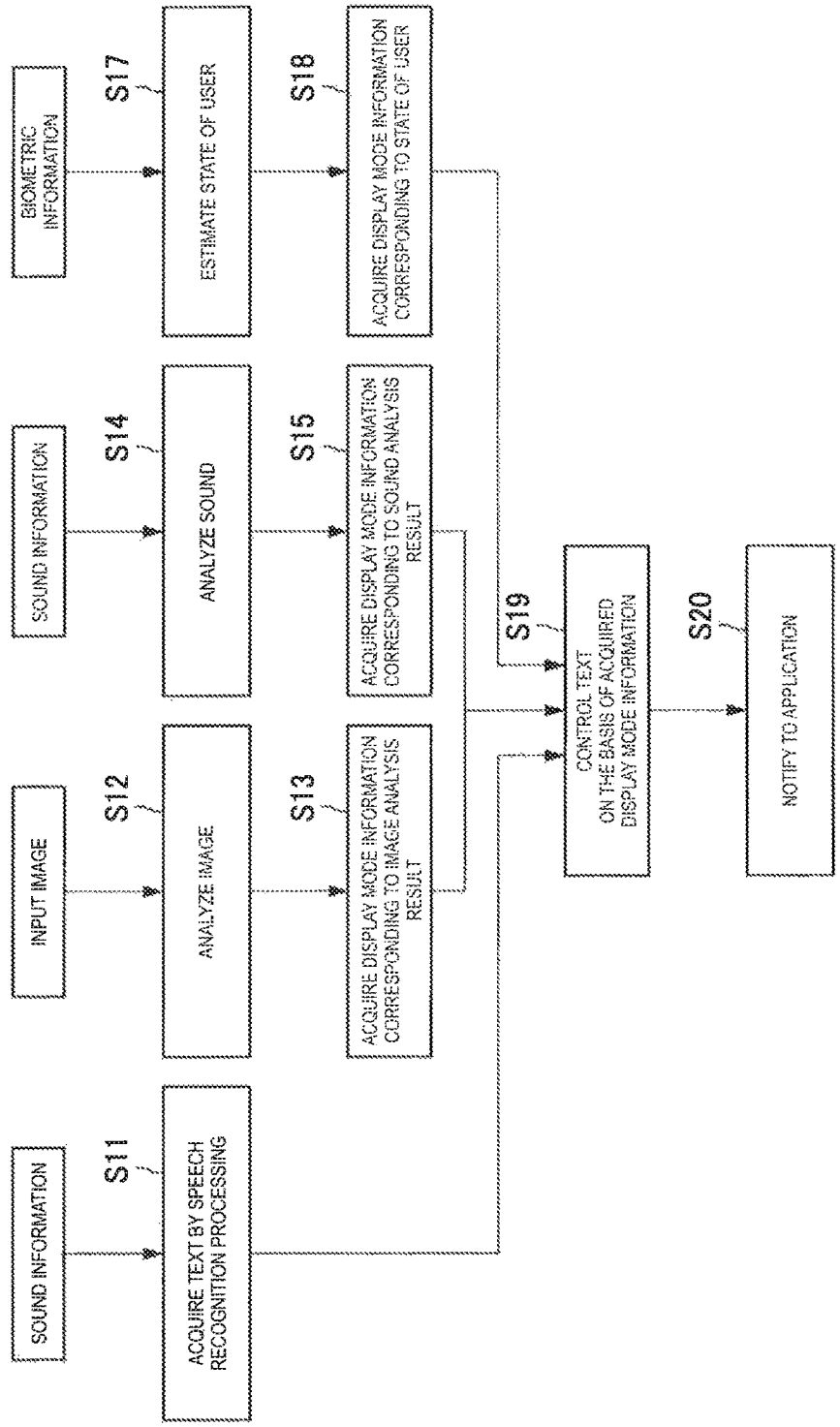
FIG. 14 is a flowchart showing an operation example of the information processing system.

An operation example of the information processing system 10-1 is now described. FIG. 14 is a flowchart showing an operation example of the information processing system 10-1. The flowchart shown in FIG. 14 illustrates an exemplary operation of the information processing system 10-1. Thus, the operation of the information processing system 10-1 is not limited to this example. When the user U1 performs the recognition start operation, the recognition start operation is input through the operation input unit 115 and the user U1 starts utterance. When the sound collection unit 120 collects the sound information, the information acquisition unit 141 acquires the sound information collected by the sound collection unit 120.

Then, if text is acquired by causing the speech recognition unit 142 to perform the speech recognition processing on the sound information (step S11), the operation proceeds to step S19. On the other hand, the display mode specifying unit 143 acquires an image analysis result by image analysis on the input image that is input by the image input unit 110 (step S12), and acquires display mode information corresponding to the image analysis result (step S13). If the display mode information corresponding to the image analysis result is acquired, the operation proceeds to step S19.

Further, the display mode specifying unit 143 acquires a sound analysis result by sound analysis on the sound information collected by the sound collection unit 120 (step S14), and acquires display mode information corresponding to the sound analysis result (step S15). If the display mode information corresponding to the sound analysis result is acquired, the operation proceeds to step S19. In addition, the display mode specifying unit 143 estimates a state of the user by analyzing the biometric information input by the biometric information input unit 118 (step S17), and acquires the display mode information corresponding to the state of the user (step S18). If the display mode information corresponding to the state of the user is acquired, the operation proceeds to step S19.

Subsequently, the display mode specifying unit 143 controls the text obtained by the speech recognition processing on the basis of the acquired display mode information (step S19). The text controlled by the display mode specifying unit 143 is notified to an application (e.g., a chat application) (step S20) and used in the application. In the case where the text is used in the chat application, the text (i.e., display information including the text and the display mode information) controlled by the display mode specifying unit 143 in this manner may be transmitted to the information processing system 10-2 of the user U2.

The operation in the information processing system 10-1 of the user U1 is mainly described above. However, as described above, when the chat application is activated, the text (i.e., display information including the text and the display mode 26 information) controlled by the display mode specifying unit 143 in the information processing system 10-1 is transmitted to the information processing system 10-2 of the user U2. Thus, in the following description, the cooperation between the information processing system 10-1 and the information processing system 10-2 will mainly be described.

Figure 15:
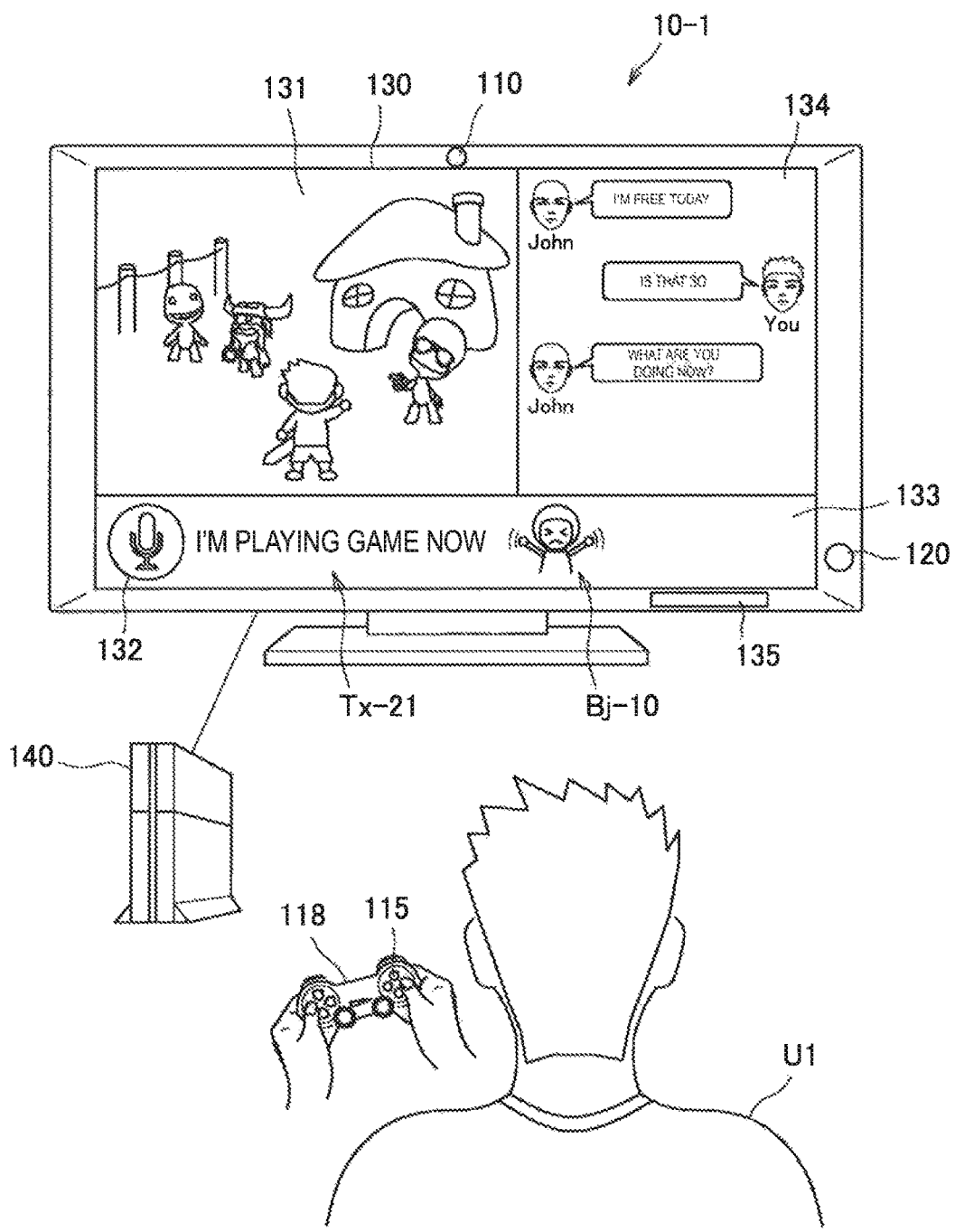
FIG. 15 is a diagram illustrated to describe a function of an information processing system to transmit display information.

FIG. 15 is a diagram illustrated to describe a function of the information processing system 10-1 to transmit display information. Referring to FIG. 15, the display unit 130 has the video image display screen 131, which is similar to the example illustrated in FIG. 3, but the user U1 is enjoying the game, and thus a video image included in the game application is displayed on the video image display screen 131.

Further, as an example of the speech recognition processing result for the sound information collected by the sound collection unit 120 of the information processing system 10-1, the text Tx-21, "I'm playing game", having the size corresponding to the volume of the sound information, is displayed on the utterance screen 133, and an object Bj-10 corresponding to the concentration level of the user U1 is added to the text Tx-21. The text Tx-21 and the display mode information (e.g., the size and the object Bj-10) displayed in this manner are transmitted to the information processing system 10-2 as the display information.

Figure 16:
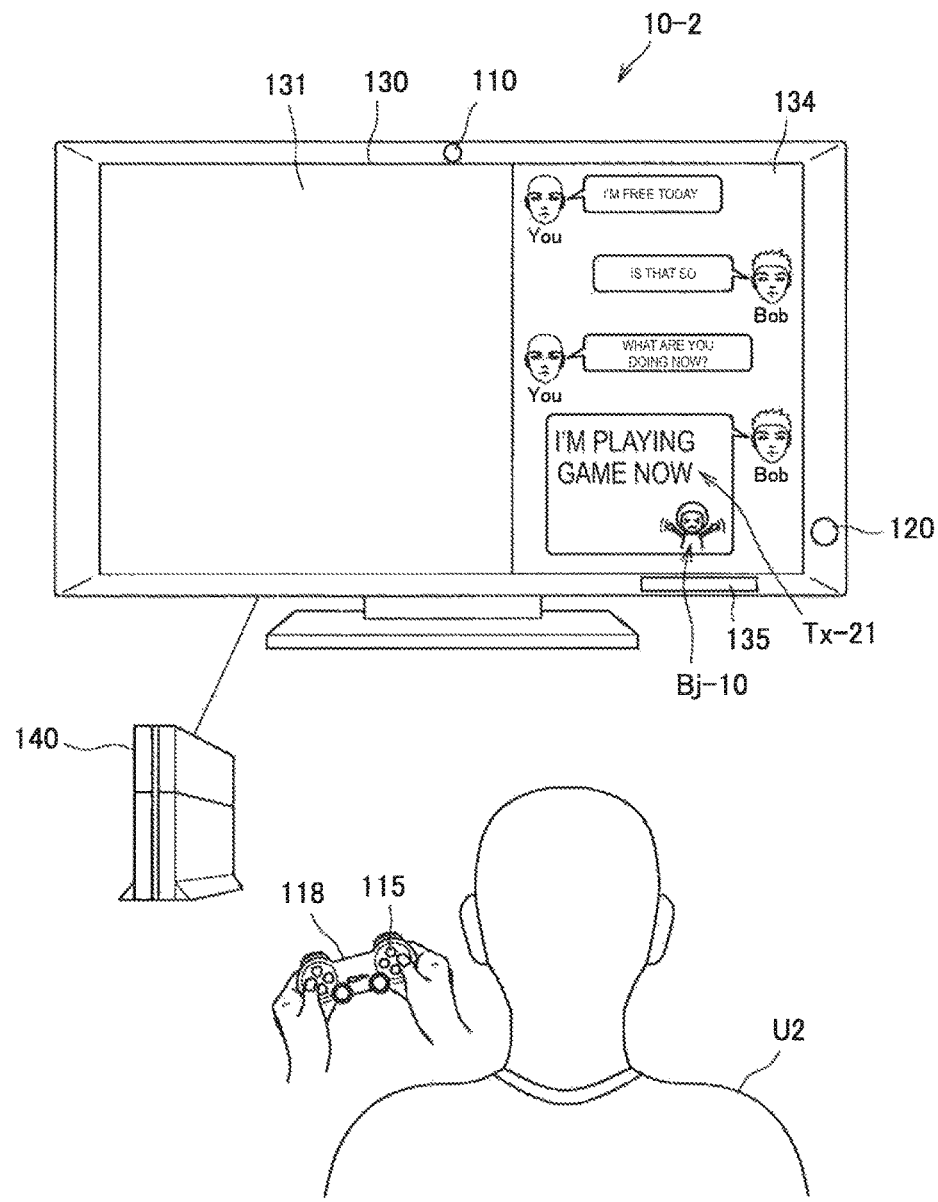
FIG. 16 is a diagram illustrated to describe a function of an information processing system to receive display information.

FIG. 16 is a diagram illustrated to describe a function of information processing system 10-2 to receive the display information. Referring to FIG. 16, the user U2 is operating the operation input unit 115. As illustrated in FIG. 16, when the information processing system 10-2 receives the text Tx-21 and the display mode information (e.g., size and object Bj-10) as the display information from the information processing system 10-1, the text Tx-21 having the object Bj-10 added thereto is displayed on a chat screen 134. In this manner, the output unit 144 in the information processing system 10-1 may be capable of outputting the display information so that the user U2 can recognize visually the text depending on the display mode specified by the display mode specifying unit 143.

The above describes an example in which the output unit 144 in the information processing system 10-1 outputs the display information so that the user U2 can recognize visually the text Tx-21 depending on the display mode specified by the display mode specifying unit 143. However, the output unit 144 in the information processing system 10-1 can switch whether to output the display information so that the user U2 can recognize visually the text depending on the display mode specified by the display mode specifying unit 143. In one example, the output unit 144 in the information processing system 10-1 may switch whether to output the display information so that the user U2 can recognize visually the text depending on the display mode specified by the display mode specifying unit 143, on the basis of the state of the user U2.

Figure 17:
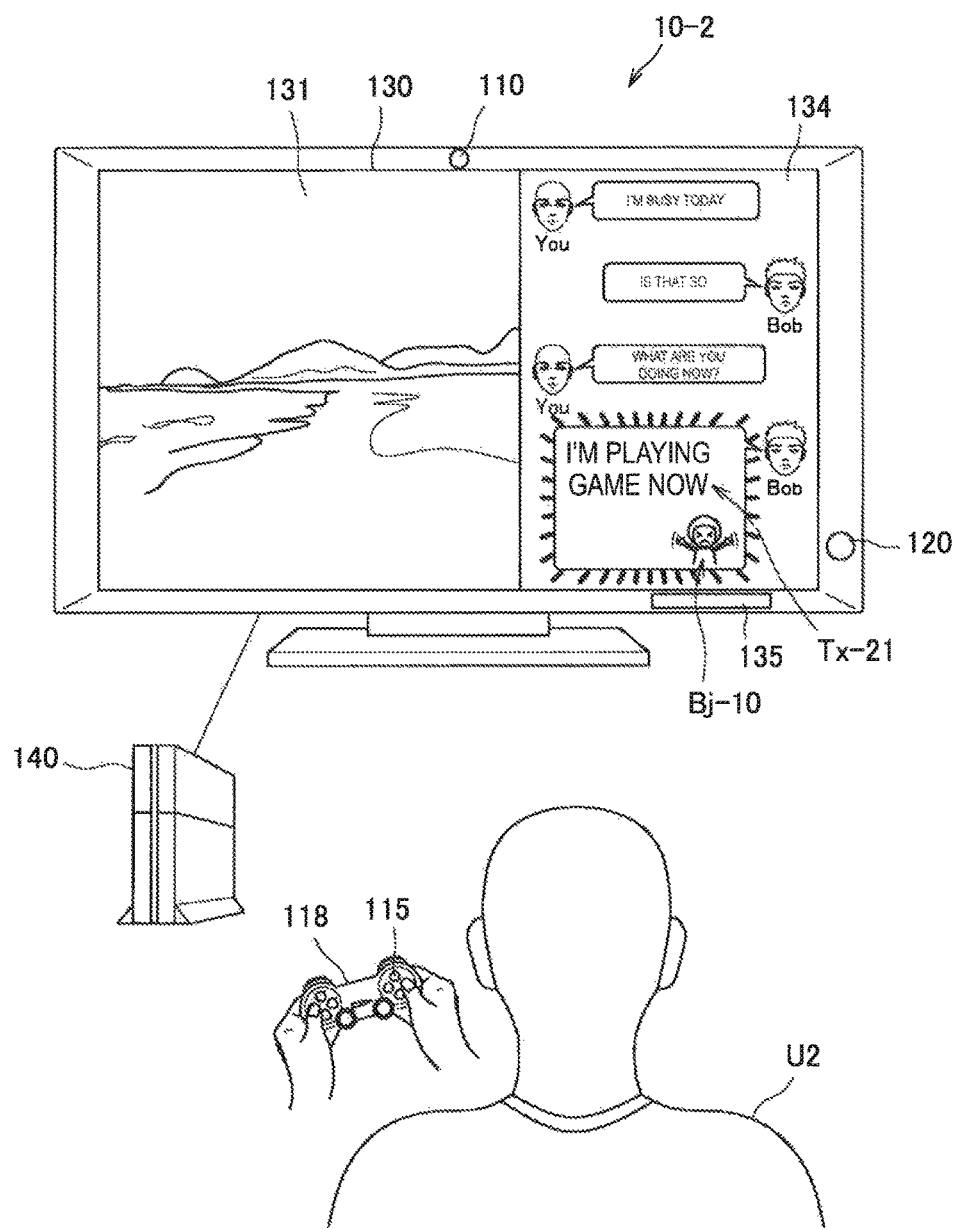
FIG. 17 is a diagram illustrating an example of display information transmitted in a case where the concentration level of a user exceeds a threshold.

In one example, in the case where the state of the user U2 is in a predetermined state, the output unit 144 in the information processing system 10-1 may output the display information so that the user U2 can recognize visually text depending on another display mode that is different from the display mode specified by the display mode specifying unit 143. FIG. 17 is a diagram illustrating an example of display information transmitted in the case where the concentration level of the user U2 exceeds a threshold. In the example illustrated in FIG. 17, the user U2 is concentrated on the video image displayed on the video image display screen 131, and thus it is envisaged that the concentration level of the user U2 exceeds the threshold.

In this case, the output unit 144 in the information processing system 10-1 adds a predetermined animated image in addition to the display mode specified by the display mode specifying unit 143, and then outputs the text Tx-21 and the display mode information (e.g., the predetermined animated image, the size, and the object Bj-10). Then, as illustrated in FIG. 17, the text Tx-21 having THE predetermined animated image (a blinking animated image in the example shown in FIG. 17) added thereto is displayed in the information processing system 10-2, and thus the user U2 can easily notice the text Tx-21.

Figure 18:
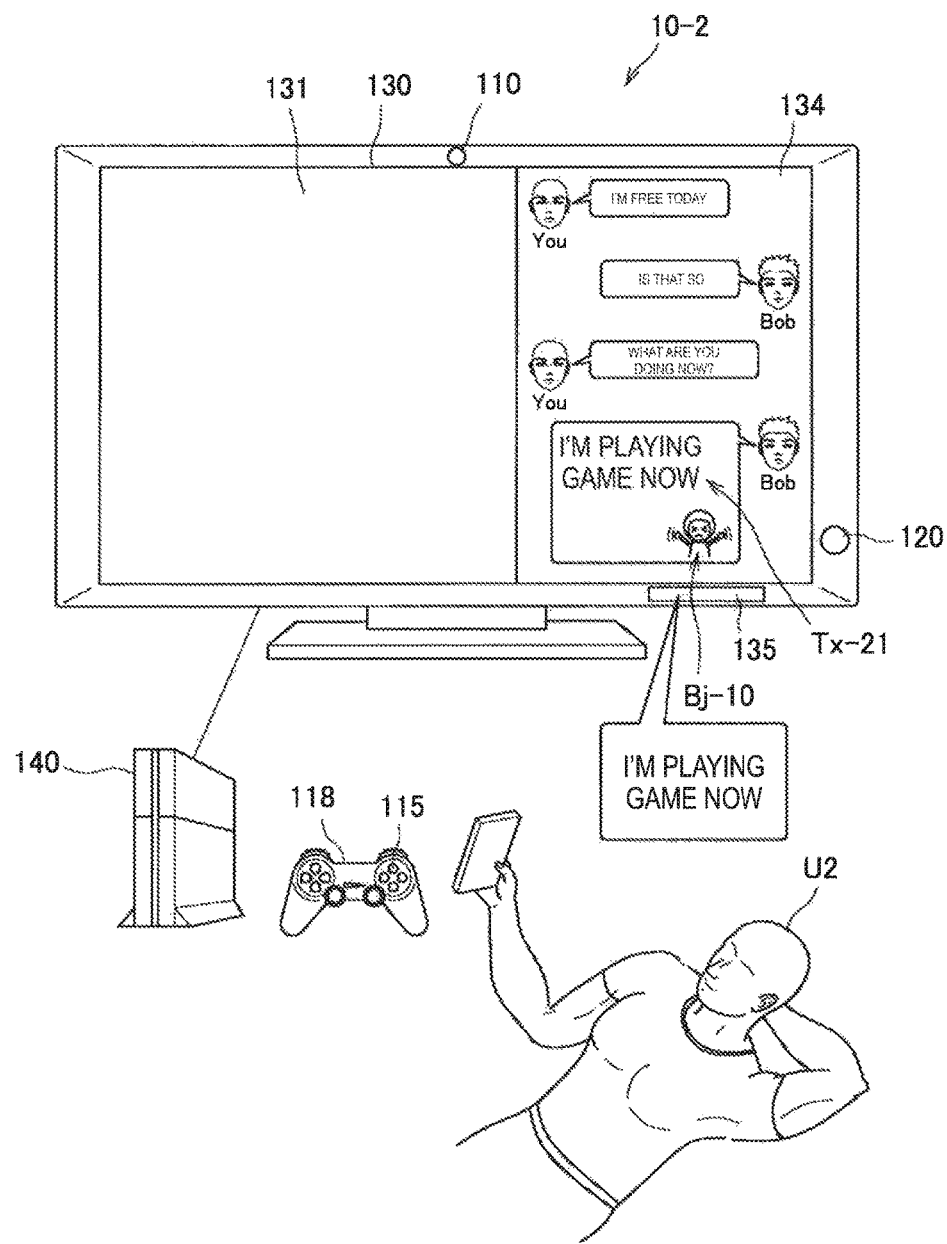
FIG. 18 is a diagram illustrating an example of display information transmitted in a case where the user does not visually recognize a chat screen.

FIG. 18 is a diagram illustrating an example of display information transmitted in the case where the user U2 does not recognize visually the chat screen 134. In the example illustrated in FIG. 18, it is envisaged that the user U2 does not recognize visually the chat screen 134. In such a case, the output unit 144 in the information processing system 10-1 may transmit predetermined sound in addition to the display mode specified by the display mode specifying unit 143. Then, as illustrated in FIG. 18, the sound output unit 135 outputs the received sound (speech obtained by reading the text Tx-21, "I'm playing game", in the example illustrated in FIG. 18) in the information processing system 10-2, and thus the user U2 can easily notice the text Tx-21.

Moreover, whether the user U2 recognize visually the chat screen 134 may be determined by analyzing the input image input by the image input unit 110 in the information processing system 10-2. The analysis of the input image may be performed in the information processing system 10-1 or in the information processing system 10-2.

Figure 19:
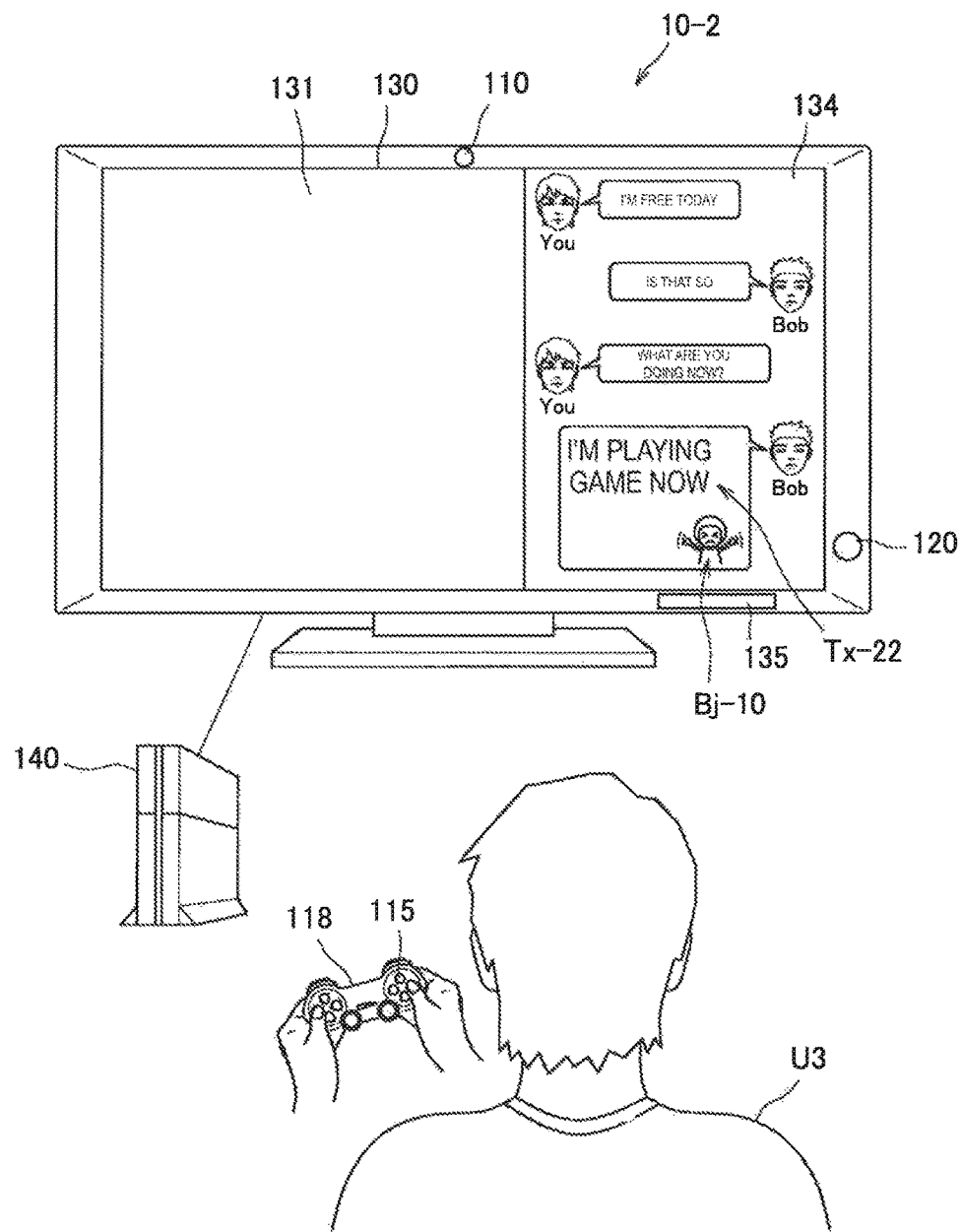
FIG. 19 is a diagram illustrating an example of display information transmitted in a case where a user uses the information processing system.

Further, the output unit 144 in the information processing system 10-1 may switch whether to output the display information so that the user U2 of the information processing system 10-2 can recognize visually the text depending on the display mode specified by the display mode specifying unit 143, on the basis of the relationship between the user U1 and the user of the information processing system 10-2. FIG. 19 is a diagram illustrating an example of display information transmitted in the case where a user U3 uses the information processing system 10-2. In the example illustrated in FIG. 19, it is envisaged that the user U3 is using the information processing system 10-2. In one example, it is envisaged that the user U3 who is in a family relationship with the user U1 uses the information processing system 10-2.

In such a case, the output unit 144 in the information processing system 10-1 may exclude a predetermined display mode (e.g., the size) from the display mode specified by the display mode specifying unit 143, and then may transmit the text Tx-21 and the display mode information (e.g., the object Bj-10). By doing so, as illustrated in FIG. 19, the text (text having the normal-sized object Bj-10 added thereto) that is not controlled by the predetermined display mode (the size in the example shown in FIG. 19) from the text Tx-21 is displayed in the information processing system 10-2. On the other hand, in the case where the user U2 in a best friend relationship with the user U1 uses the information processing system 10-2, as illustrated in FIG. 16, the output unit 144 in the information processing system 10-1 may transmit all the text Tx-21 and the display mode information (e.g., the size and the object Bj-10). By doing so, as illustrated in FIG. 16, the text (text having the object Bj-10 with the size larger than normal size added thereto) controlled by the display mode (the size and the object Bj-10, in the example shown in FIG. 16) from the text Tx-21 is displayed in the information processing system 10-2. This makes it possible to make the display mode of text visually recognized between the user U2 and the user U3 different.

Moreover, the display mode information to be transmitted may be registered previously for each user or for each group (e.g., friend, boss, best friend, and family 16 member) to which the user belongs, and the display mode information to be transmitted may be decided on the basis of the display mode information previously registered in this manner. Alternatively, the display mode information to be transmitted can be designated by the user U1 and may be decided on the basis of the display mode information designated by the user U1. The decision on the display mode information to be transmitted may be executed by the display mode specifying unit 143 in the information processing system 10-1.

The cooperation between the information processing system 10-1 and the information processing system 10-2 is described above.

1.4. Modifications

As described above, the display mode may be specified further on the basis of the information related to the user U1. Here, as described above, the information related to the user U1 is not limited to a particular one. In one example, the information related to the user U1 may include at least one of behavior information of the user U1, the type of a device operated by the user U1, and the environmental information around the user U1. The behavior information can be obtained in any way, but it may be obtained by analyzing position information of the device held by the user U1. In addition, although environmental information can be obtained in any way, it may be obtained by analyzing sound information collected near the user U1.

Figure 20A:
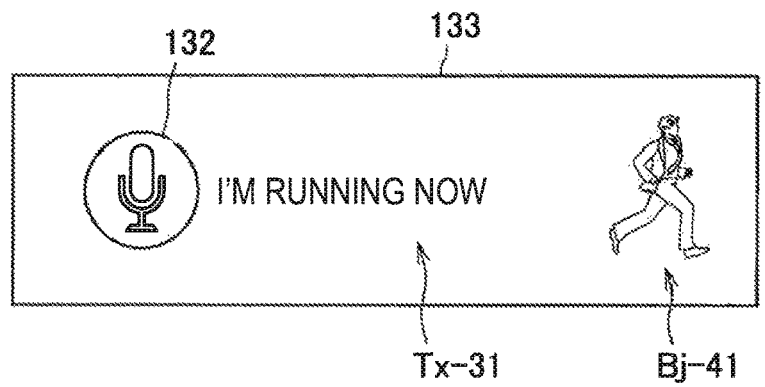
FIG. 20A is a diagram illustrating an example of an object added to text in a case where behavior information of a user indicates that the user is running.

FIG. 20A is a diagram illustrating an example of an object added to the text in the case where the behavior information of the user U1 indicates that the user is running. As illustrated in FIG. 20A, in the case of obtaining the behavior information indicating that the user U1 is running, an object Bj-41 corresponding to text Tx31 may be added.

Figure 20B:
FIG. 20B is a diagram illustrating an example of an object added to text in a case where environmental information of a user indicates that there is a person in the surroundings.

FIG. 20B is a diagram illustrating an example of an object added to the text in the case where the environmental information of the user U1 indicates that there is a person in the surroundings. As illustrated in FIG. 20B, in the case of obtaining the environmental information indicating that there is a person around the user U1, an object Bj-42 corresponding to text Tx32 may be added.

Figure 20C:
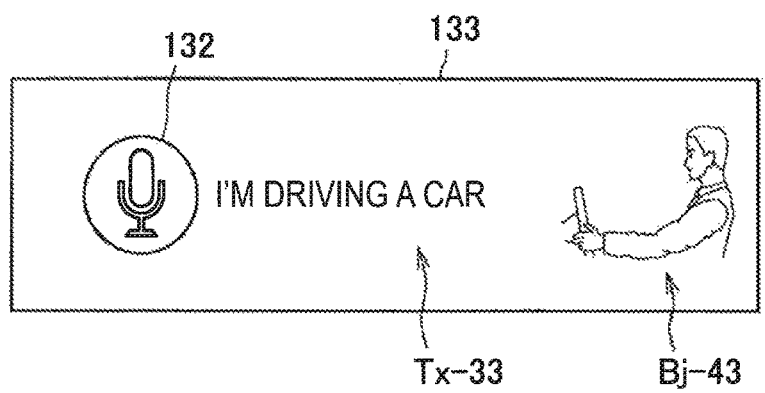
FIG. 20C is a diagram illustrating an example of an object added to text in a case where behavior information of a user indicates that the user is driving a car.

FIG. 20C is a diagram illustrating an example of an object added to the text in the case where the behavior information of the user U1 indicates that the user is driving a car. As illustrated in FIG. 20C, in the case of obtaining the behavior information indicating that the user U1 is driving a car, an object Bj-43 corresponding to text Tx33 may be added.

1.5. Hardware Configuration Example

The hardware configuration of the information processing system 10 according to the embodiment of the present disclosure is now described with reference to FIG. 21. FIG.

21 is a block diagram illustrating a hardware configuration example of the information processing system 10 according to the embodiment of the present disclosure.

As illustrated in FIG. 21, the information processing system 10 includes a central processing unit (CPU) 901, a read only memory (ROM) 903, and a random access memory (RAM) 905. In addition, the information processing system 10 may include a host bus 907, a bridge 909, an external bus 911, an interface 913, an input device 915, an output device 917, a storage device 919, a drive 921, a connection port 923, and a communication device 925. The information processing system 10 may further include an image capturing device 933 and a sensor 935 as necessary. In conjunction with, or in place of, the CPU 901, the information processing system 10 may have a processing circuit called a digital signal processor (DSP) or application specific integrated circuit (ASIC).

The CPU 901 functions as an arithmetic processing unit and a control device, and controls the overall operation in the information processing system 10 or a part thereof in accordance with various programs recorded in the ROM 903, the RAM 905, the storage device 919, or the removable recording medium 927. The ROM 903 stores, for example, programs and operation parameters used by the CPU 901. The RAM 905 temporarily stores, for example, programs to be used in the execution by the CPU 901 and parameters that change as appropriate in executing the programs. The CPU 901, the ROM 903, and the RAM 905 are connected with each other via a host bus 907 that is composed of an internal bus such as a CPU bus. Furthermore, the host bus 907 is connected to an external bus 911 such as peripheral component interconnect (PCI)/interface bus via a bridge 909.

The input device 915 is, for example, a device operated by a user, such as a mouse, a keyboard, a touch panel, a button, a switch, and a lever. The input device 915 may include a microphone for detecting user's voice. The input device 915 may be, for example, a remote control device using infrared rays or other radio waves, or may be an external connection device 929 such as a cellular phone conforming to the operation of the information processing system 10. The input device 915 includes an input control circuit that generates an input signal on the basis of the information input by the user and outputs it to the CPU 901. The user inputs various data to the information processing system 10 and instructs the information processing system 10 to perform a processing operation by operating the input device 915. In addition, the image capturing device 933, which will be described later, can also function as an input device by capturing the movement of the user's hand or finger, and the like. In this case, the pointing position may be determined depending on the motion of the hand or the orientation of the finger.

The output device 917 is composed of a device capable of notifying visually or audibly the user of the acquired information. The output device 917 may be a display device such as a liquid crystal display (LCD), a plasma display panel (PDP), an organic electro-luminescence (EL) display, and a projector, a hologram display device, an audio output device such as a speaker and a headphone, as well as printer devices or the like. The output device 917 outputs the result obtained by the processing of the information processing system 10 as a video such as a text or an image, or outputs it as audio such as a voice or sound. In addition, the output device 917 may include, for example, a light for lighting up the surroundings.

The storage device 919 is a data storage device configured as an example of a storage portion of the information processing system 10. The storage device 919 is composed of, for example, a magnetic storage device such as hard disk drives (HDDs), a semiconductor storage device, an optical storage device, and a magneto-optical storage device. The storage device 919 stores programs executed by the CPU 901, various data, various types of data obtained from the outside, and the like.

The drive 921 is a reader-writer for a removable recording medium 927 such as a magnetic disk, an optical disk, a magneto-optical disk, and a semiconductor memory, and is incorporated in the information processing system 10 or externally attached thereto. The drive 921 reads the information recorded in the attached removable recording medium 927 and outputs it to the RAM 905. In addition, the drive 921 writes in the attached removable recording medium 927.

The connection port 923 is a port for directly connecting the device to the information processing system 10. The connection port 923 may be, for example, a universal serial bus (USB) port, an IEEE 1394 port, or a small computer system interface (SCSI) port. In addition, the connection port 923 may be, for example, an RS-232C port, an optical audio terminal, or high-definition multimedia interface (HDMI, registered trademark) port. The external connection device 929 is connected to the connection port 923, and thus various kinds of data can be exchanged between the information processing system 10 and the external connection device 929.

The communication device 925 is, for example, a communication interface composed of a communication device or the like, which is used to be connected to the communication network 931. The communication device 925 may be, for example, a communication card for wired or wireless local area network (LAN), Bluetooth (registered trademark), or wireless USB (WUSB). In addition, the communication device 925 may be, for example, a router for optical communication, a router for asymmetric digital subscriber line (ADSL), or a modem for various communications. The communication device 925 transmits and receives signals or the like using a predetermined protocol such as TCP/IP, for example, with the Internet or other communication devices. In addition, the communication network 931 connected to the communication device 925 is a network connected by wire or wireless, and is, for example, the Internet, home LAN, infrared communication, radio wave communication, satellite communication, or the like.

The image capturing device 933 captures a real space and generates a captured image, by using an image sensor such as charge-coupled device (CCD) or complementary-metal-oxide semiconductor (CMOS) and various members such as a lens for controlling imaging of a subject image on the image sensor. The image capturing device 933 may capture a still image or a moving image.

The sensor 935 is, for example, various sensors such as an accelerometer, a gym sensor, a geomagnetic sensor, a photosensor, and a sound sensor. The sensor 935 acquires information on the state of the information processing system 10 itself, such as the attitude of the casing of the information processing system 10, and information on the surrounding environment of the information processing system 10 such as brightness or noise around the information processing system 10. The sensor 935 may also include a GPS sensor, which receives global positioning system (GPS) signals and measures the latitude, longitude, and altitude of the device.

The above description is given as to the example of the hardware configuration of the information processing system 10. Each of the components described above may be configured using a general-purpose member, or may be configured with hardware dedicated to the function of each component. Such a configuration can be changed appropriately depending on the technical level at the time of implementation.

2. CONCLUSION

As described above, according to the embodiment of the present disclosure, there is provided the information processing device 140 including the information acquisition unit 141 and the output unit 144. The information acquisition unit 141 is configured to acquire a parameter related to the speech recognition processing on the sound information collected by the sound collection unit 120. The output unit 144 is configured to output the display information used to display the speech recognition processing result for the sound information on the basis of the display mode specified depending on the parameter. This configuration makes it possible for the user to know intuitively the situation in which the speech recognition processing is performed, on the basis of the display mode of the speech recognition processing result.

In particular, according to the embodiment of the present disclosure, in the case where a desired speech recognition processing result is not obtained, it is possible to know intuitively the reason why the desired speech recognition processing is not obtained by visually recognizing the speech recognition processing result specified depending on the parameter related to the speech recognition processing. The incorporation of the understood reason in the next utterance makes it possible to increase the possibility that the desired speech recognition processing result will be obtained next time.

Further, according to the embodiment of the present disclosure, it is possible to change the display mode of the speech recognition processing result at the same time as the utterance. Thus, according to the embodiment of the present disclosure, it is possible to change the display mode of the speech recognition processing result by a simple method as compared with a case where it is performed manually separately from utterance.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Furthermore, it is possible to create a program for causing the hardware such as CPU, ROM and RAM incorporated in the computer to execute functions equivalent to those of the control unit 140 as described above. In addition, a computer-readable recording medium on which the program is recorded can also be provided.

Moreover, when the operation of the information processing system 10 described above is implemented, the position of each component is not limited to a particular one. As a specific example, the control unit 140 may be provided in a device different from a device provided with the image input unit 110, the operation input unit 115, the biometric information input unit 118, the sound collection unit 120, the communication unit 125, the display unit 130, and the sound output unit 135. These devices may be connected via a network. In this case, the control unit 140 may correspond to, for example, a server such as web server or cloud server. The image input unit 110, the operation input unit 115, the biometric information input unit 118, the sound collection unit 120, the communication unit 125, the display unit 130, and the sound output unit 135 may correspond to clients connected to the server via the network.

Further, all the components included in the control unit 140 are not necessarily provided in the same device. In one example, some of the information acquisition unit 141, the speech recognition unit 142, the display mode specifying unit 143, and the output unit 144 may be included in a device different from a device provided with the control unit 140. In one example, the speech recognition unit 142 and the display mode specifying unit 143 may be included in a server different from a server provided with the control unit 140 including the information acquisition unit 141 and the output unit 144.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

an information acquisition unit configured to acquire a parameter related to speech recognition processing on sound information based on sound collection; and an output unit configured to output display information used to display a speech recognition processing result for the sound information on the basis of a display mode specified depending on the parameter.

(2)

The information processing device according to (1), wherein the parameter includes utterance information of a user, the utterance information being included in the sound information.

(3)

The information processing device according to (1), wherein the parameter includes information related to noise corresponding to utterance of a user, the information related to the noise being included in the sound information.

(4)

The information processing device according to (3), wherein the information related to the noise includes at least one of a type of the noise, volume of the noise, and a direction from a noise source to a sound collection unit.

(5)

The information processing device according to (2), wherein the utterance information of the user includes at least one of utterance volume of the user included in the sound information, speech likeness of the sound information, a frequency of the sound information, utterance speed of speech included in the sound information, information related to a word ending of speech included in the sound information, and a confidence level of the speech recognition processing result.

(6)

The information processing device according to any one of (1) to (5), wherein the display mode includes at least one of size, shape, saturation, font, blurring degree, and cracking degree of the speech recognition processing result, a type of an animated image added to the speech recognition processing result, and a type of an object added to the speech recognition processing result.

(7)

The information processing device according to any one of (1) to (6), wherein the display mode is specified further on the basis of information related to a first user.

(8)

The information processing device according to (7), wherein the information related to the first user includes at least one of biometric information and emotion information of the first user.

(9)

The information processing device according to (7), wherein the information related to the first user includes at least one of sex and age of the first user.

(10)

The information processing device according to (7), wherein the information related to the first user includes at least one of behavior information of the first user, a type of a device operated by the first user, and environmental information around the first user.

(11)

The information processing device according to any one of (7) to (10), wherein the output unit is capable of outputting the display information so that the speech recognition processing result based on the display mode is recognized visually by a second user different from the first user.

(12)

The information processing device according to (11), wherein the output unit is capable of switching whether to output the display information so that the speech recognition processing result based on the display mode is recognized visually by the second user.

(13)

The information processing device according to (12), wherein the output unit switches whether to output the display information so that the speech recognition processing result based on the display mode is recognized visually by the second user on the basis of a state of the second user.

(14)

The information processing device according to (13), wherein the output unit, in a case where the state of the second user is in a predetermined state, outputs the display information so that the speech recognition processing result is recognized visually by the second user on the basis of another display mode different from the display mode.

(15)

The information processing device according to any one of (12) to (14), wherein the output unit switches whether to output the display information so that the speech recognition processing result based on the display mode is recognized visually by the second user on the basis of a relationship between the first user and the second user.

(16)

The information processing device according to (15), wherein the output unit, in a case where the relationship between the first user and the second user indicates a predetermined relationship, outputs the display information so that the speech recognition processing result is recognized visually by the second user on the basis of another display mode different from the display mode.

(17)

The information processing device according to any one of (7) to (16), wherein the display mode is changeable on the basis of a predetermined change operation by the first user.

(18)

The information processing device according to any one of (1) to (17), further including:

a display mode specifying unit configured to specify the display mode depending on the parameter.

(19)

A method of information processing, the method including:

acquiring a parameter related to speech recognition processing on sound information collected by a sound collection unit; and outputting, by a processor, display information used to display a speech recognition processing result for the sound information on the basis of a display mode specified depending on the parameter.

(20)

A program for causing a computer to function as an information processing device including:

an information acquisition unit configured to acquire a parameter related to speech recognition processing on sound information collected by a sound collection unit; and an output unit configured to output display information used to display a speech recognition processing result for the sound information on the basis of a display mode specified depending on the parameter.

REFERENCE SIGNS LIST 10 information processing system
110 image input unit
115 operation input unit
118 biometric information input unit
120 sound collection unit
125 communication unit
130 display unit
135 sound output unit
140 control unit (information processing device)
141 information acquisition unit
142 speech recognition unit
143 display mode specifying unit
144 output unit
180 display unit

The invention claimed is:

1. An information processing device comprising:
   a sound recognition unit configured to perform sound recognition processing on sound information including utterance information of a first user, to obtain text;
   an information acquisition unit configured to acquire a parameter related to the sound recognition processing; and
   an output unit configured to output display information used to display a sound recognition processing result for the sound information on the basis of a display mode specified depending on the parameter,
   wherein the output unit switches whether to output the display information so that the sound recognition processing result based on the display mode is visually recognizable by a second user different from the first user, based on information of the second user, and
   wherein the sound recognition unit, the information acquisition unit, and the output unit are each implemented via at least one processor.

2. The information processing device according to claim 1,
wherein the parameter includes the utterance information of the first user.

3. The information processing device according to claim 1,
wherein the parameter includes information related to noise corresponding to the utterance of the first user, the information related to the noise being included in the sound information.

4. The information processing device according to claim 3, further comprising:
a sound collection unit configured to collect the sound information,
wherein the information related to the noise includes at least one of a type of the noise, volume of the noise, or a direction from a noise source to the sound collection unit, and
wherein the sound collection unit is implemented via at least one processor.

5. The information processing device according to claim 2,
wherein the utterance information of the first user includes at least one of utterance volume of the first user included in the sound information, speech likeness of the sound information, a frequency of the sound information, utterance speed of speech included in the sound information, information related to a word ending of speech included in the sound information, or a confidence level of the sound recognition processing result.

6. The information processing device according to claim 1,
wherein the display mode includes at least one of size, shape, saturation, font, blurring degree, or cracking degree of the sound recognition processing result.

7. The information processing device according to claim 1,
wherein the display mode is specified further on the basis of information related to the first user.

8. The information processing device according to claim 7,
wherein the information related to the first user includes at least one of biometric information or emotion information of the first user.

9. The information processing device according to claim 7,
wherein the information related to the first user includes at least one of sex or age of the first user.

10. The information processing device according to claim 7,
wherein the information related to the first user includes at least one of behavior information of the first user, a type of a device operated by the first user, or environmental information around the first user.

11. The information processing device according to claim 1,
wherein the information of the second user is a state of the second user.

12. The information processing device according to claim 11,
wherein the output unit, in a case where the state of the second user is in a predetermined state, outputs the display information so that the sound recognition processing result is visually recognizable by the second user on the basis of another display mode different from the display mode.

13. The information processing device according to claim 1,
wherein the information of the second user is a relationship between the first user and the second user.

14. The information processing device according to claim 13,
wherein the output unit, in a case where the relationship between the first user and the second user indicates a predetermined relationship, outputs the display information so that the sound recognition processing result is visually recognizable by the second user on the basis of another display mode different from the display mode.

15. The information processing device according to claim 7,
wherein the display mode is changeable on the basis of a predetermined change operation by the first user.

16. The information processing device according to claim 1, further comprising:
a display mode specifying unit configured to specify the display mode depending on the parameter,
wherein the display mode specifying unit is implemented via at least one processor.

17. The information processing device according to claim 1, wherein the display mode includes at least one of a type of an animated image added to the text, a type of an object added to the text, or a size of the object added to the text.

18. The information processing device according to claim 17,
wherein a position to which the object is added includes at least one of a head of the text or an end of the text.

19. A method of information processing, the method comprising:
performing sound recognition processing on sound information including utterance information of a first user, to obtain text;
acquiring a parameter related to the sound recognition processing;
outputting, by a processor, display information used to display a sound recognition processing result for the sound information on the basis of a display mode specified depending on the parameter; and
switching whether to output the display information so that the sound recognition processing result based on the display mode is visually recognizable by a second user different from the first user, based on information of the second user.

20. A non-transitory computer-readable medium having embodied thereon a program, which when executed by a computer causes the computer to execute a method, the method comprising:
performing sound recognition processing on sound information including utterance information of a first user, to obtain text;
acquiring a parameter related to the sound recognition processing;
outputting display information used to display a sound recognition processing result for the sound information on the basis of a display mode specified depending on the parameter; and
switching whether to output the display information so that the sound recognition processing result based on the display mode is visually recognizable by a second user different from the first user, based on information of the second user.

* * * * *